US012373512B2

(12) United States Patent
Weinert, Jr. et al.

(10) Patent No.: US 12,373,512 B2
(45) Date of Patent: Jul. 29, 2025

(54) METHOD AND SYSTEM FOR AUTOMATING WEB PROCESSES UTILIZING AN ABSTRACTABLE UNDERLYING PLATFORM LAYER

(71) Applicant: Q2 Software, Inc., Austin, TX (US)

(72) Inventors: Scott Nielsen Weinert, Jr., Spokane, WA (US); Sean Michael Hill, Mesa, AZ (US); Kris Golez Doromal, Pflugerville, TX (US)

(73) Assignee: Q2 SOFTWARE, INC., Austin, TX (US)

(*) Notice: Subject to any disclaimer, the term of this patent is extended or adjusted under 35 U.S.C. 154(b) by 1042 days.

(21) Appl. No.: 16/452,849

(22) Filed: Jun. 26, 2019

(65) Prior Publication Data

US 2020/0004798 A1 Jan. 2, 2020

Related U.S. Application Data

(60) Provisional application No. 62/690,541, filed on Jun. 27, 2018.

(51) Int. Cl.
*G06F 16/953* (2019.01)
*G06F 16/951* (2019.01)
(Continued)

(52) U.S. Cl.
CPC .......... *G06F 16/986* (2019.01); *G06F 16/951* (2019.01); *G06F 16/953* (2019.01); *G06F 16/9577* (2019.01)

(58) Field of Classification Search
CPC .. G06F 16/986; G06F 16/953; G06F 16/9577; G06F 16/951

(Continued)

(56) References Cited

U.S. PATENT DOCUMENTS

2010/0241990 A1 9/2010 Gabriel
2015/0381703 A1* 12/2015 Mahamuni ............ H04L 67/025
709/217

(Continued)

FOREIGN PATENT DOCUMENTS

AU 2005201433 B2 12/2005

OTHER PUBLICATIONS

Cherkashin, Aleksandr, Productivity and time management improvement using a web application, 2017, Bachelor Thesis, Haaga-Helia University Degree Programme in Business (Year: 2017).*

(Continued)

*Primary Examiner* — Stephen S Hong
*Assistant Examiner* — Tionna M Burke
(74) *Attorney, Agent, or Firm* — Sprinkle IP Law Group

(57) ABSTRACT

Embodiments as disclosed provide improved RPA systems and methods that utilize a set of reusable modules. These modules may include an associated set of configurable parameters and be associated with instructions for a browser automation platform. An RPA application to accomplish a task at a target website is built using these modules. The RPA application may be executed at the RPA system using an instance of a browser. The RPA application can be executed by evaluating an identified module of the RPA application based on the configuration parameters to determine instructions for a browser automation platform for the identified module. These browser automation platform instructions can then be provided to the browser automation platform to execute against the browser instance.

21 Claims, 25 Drawing Sheets

(51) Int. Cl.
G06F 16/957 (2019.01)
G06F 16/958 (2019.01)

(58) Field of Classification Search
USPC .......................................................... 715/234
See application file for complete search history.

(56) References Cited

U.S. PATENT DOCUMENTS

| 2017/0017528 | A1  | 1/2017 | Hua et al. | |
| 2017/0052824 | A1* | 2/2017 | Sharma | G06F 9/453 |
| 2019/0095999 | A1* | 3/2019 | Li | G06N 5/025 |
| 2019/0129827 | A1* | 5/2019 | Ramasamy | G06F 11/3664 |

OTHER PUBLICATIONS

International Preliminary Report on Patentability (IPRP) issued for PCT Application No. PCT/US2019/039235, mailed Jan. 7, 2021, 9 pages.
International Search Report and Written Opinion of the International Searching Authority for International Patent Application No. PCT/US2019/039235, mailed Sep. 19, 2019, 10 pgs.

* cited by examiner

FIG. 4B

New Instruction
Basic auth Generator

LOGIN URL
e.g. http://www.goggle.com/login

ELEMENT TO WAIT FOR AFTER NAVIGATING TO LOGIN URL (OPTIONAL)
e.g. #selectorName    [COPY]

LOGIN FIELDS
Form Name | Selector
□         | e.g. #selectorName    [COPY]

TYPE LIKE A KEYBOARD?
☐ YES

LOGIN CONFIGURATION Either use "Failed URL Slug" or "Failed Selector" to check if authentication failed
Submit Button Selector | Failed URL Slug | Failed Selector
e.g. #selectorName [COPY] | e.g. Login | e.g. #selectorName [COPY]

VERIFY AUTHENTICATION WITH CUSTOM CODE
☐ YES

USE A JAVASCRIPT CLICK?
☐ YES

WAIT FOR A PAGE TO REDIRECT
☐ YES

ELEMENT TO WAIT FOR AFTER CLICKING "SUBMIT" (OPTIONAL)
e.g. #selectorName    [COPY]

"REMEMBER ME" SELECTOR (OPTIONAL)
e.g. #selectorName    [COPY]

LOAD COOKIES AFTER NAVIGATING?
☐ YES

DO YOU WANT TO CONFIGURE TEXT MATCHES TO CONFIRM THAT THE LOGIN FAILED?
☐ YES

DO YOU NOT WANT TO SEND AN AUTH RESPONSE?   Select this if using this instruction before MFA
☐ YES

INSTRUCTION TO RUN AFTER SUCCESSFUL AUTHENTICATION

Instruction Type / Generator Type / Basic auth

[CLOSE]

FIG. 4D

New Instruction
Multiple accounts Generator

CODE TO EXTRACT ACCOUNTS
Use cheerio syntax to extract a list of objects from the DOM
EXAMPLE

```
1  // Return a list of objects that represent a list of accounts. Each object will have a "uid"...
2  // The "uid" is any identifier you can find on the page that is unique to the account.
3  // the "link" is a CSS selector that will be used to click into an individual account page.
4  return [{
5     uid: 'Account 1234'
6     link: '.account:nth-child(1)',
7  }]
```

YOUR CODE

```
1
```

WHICH GROUP SHOULD BE EXECUTED FOR EACH ACCOUNT?

Instruction Type / Generator Type / Multiple accounts

[ CLOSE ]

FIG. 4E

New Instruction
Confirm auth failed Generator

AUTHED STORAGE KEY
e.g. Authed

TEXT MATCHES
e.g. Username or password is invalid

Instruction Type / Generator Type / Confirm auth failed

[ CLOSE ]

FIG. 4F

New Instruction
Captcha Generator

WHAT TYPE OF CAPTCHA?
⦿ IMAGE WITH TEXT
○ GOOGLE NOCAPTCHA

WHAT SERVICE PROVIDER?
⦿ ANTICAPTCHA (DEFAULT)
○ DEATH BY CAPTCHA

WHERE SHOULD WE GET THE IMAGE FROM?
○ IMAGE SRC
○ ELEMENT SCREENSHOT
○ CLIPPED ELEMENT

IS THE IMAGE ALREADY ENCODED IN BASE64?
☐ YES

WHAT IS THE SELECTOR THAT CONTAINS THE CAPTCHA?
[e.g. #selectorName]  [COPY]

WHAT IS THE SELECTOR OF THE INPUT TO TYPE THE CAPTCHA CODE INTO?
[e.g. #selectorName]  [COPY]

INSERT CAPTCHA RESULT WITH JAVASCRIPT?
☐ YES

Instruction Type / Generator Type / Captcha

[CLOSE]

FIG. 4G

New Instruction
Ad-Clicker Generator

EXTRACT WITH CUSTOM CODE
☐ YES

SELECTOR TO LOOK FOR/CLICK
| e.g. #selectorName | [COPY] |

USE A JAVASCRIPT CLICK?
☐ YES

WAIT FOR ELEMENT (OPTIONAL)
| e.g. #selectorName | [COPY] |

WAIT FOR TIME (OPTIONAL)
1000

Instruction Type / Generator Type / Ad-Clicker

[CLOSE]

FIG. 5B

New Instruction
Navigate Handler

WHERE TO GET URL FROM
○ MANUAL ENTRY
○ STORAGE KEY

FORCE NAVIGATE
Navigate to URL specified regardless if it's the same as the current URL
☐ YES ELEMENT TO WAIT FOR AFTER NAVIGATING (OPTIONAL)
| e.g. #selectorName | [COPY] |

Instruction Type / Handler Type / Navigate

[CLOSE]

FIG. 5H

New Instruction
Download Handler

FILE STORAGE KEY
| e.g. Downloaded File |

SELECTOR
| e.g. #selectorName | [COPY] |

Instruction Type / Handler Type / Download

[CLOSE]

FIG. 5C

```
New Instruction
Input Handler

SELECTOR
[e.g. #selectorName]    [COPY]

WHERE TO ENTER DATA FROM
○ MANUAL ENTRY
○ STORAGE KEY

TYPE LIKE A KEYBOARD?
☐ YES

Instruction Type / Handler Type / Input

[CLOSE]
```

```
New Instruction
Select Handler

SELECTOR
[e.g. #selectorName]    [COPY]

HOW WOULD YOU LIKE TO SELECT?
○ BY VALUE
○ BY INDEX

WHERE TO SELECT DATA FROM
○ MANUAL ENTRY
○ STORAGE KEY

Instruction Type / Handler Type / Select

[CLOSE]
```

New Instruction
Extract Handler

STORAGE KEY
e.g. Extracted Text

TIMEOUT (OPTIONAL)
e.g. 5000

EXTRACT SOURCE OF PAGE
☐ YES

EXTRACT WITH CUSTOM CODE
☐ YES

SELECTOR
e.g. #selectorName          [COPY]

FALLBACK TEXT
Use this when you want to match text that means the selector you're looking for will never appear.
E.g. "No payments yet"
☐ YES Instruction Type / Handler Type / Extract

[CLOSE]

FIG. 5F

| New Instruction |
| Condition Handler |

STORAGE KEY
e.g. Condition Result

CONDITION TYPE

REVERSE RESULT
Whether the result of the boolean condition should be reversed
☐ YES Instruction Type / Handler Type / Condition

[ CLOSE ]

| New Instruction |
| Execute Handler |

JAVASCRIPT TO EXECUTE
1

RESULT STORAGE KEY (OPTIONAL)
e.g. Execute Result

Instruction Type / Handler Type / Execute

[ CLOSE ]

What type of hook is this?

FILTER BY GROUP

All ▼

602 Data gauntlet
Allows you to access and manipulate the storage via custom code

604 Extract PDF
Extract all strings from PDF or use coordinates for specific extraction

606 Auth response
Sends a response containing the result of authentication

608 Bill has balance
Query the database to determine whether or not the current bill has a balance

610 Bill response
Sends a response containing the result of bill data

Mark as paid
Marks a bill as being paid already

Send To Audits
Will send job to audits

616 Decision
Decide the next instruction to run

Execute Group
Execute a group of instructions

Module Completed
Specifies when a module has completed execution

| | New Instruction | |
|---|---|---|
| | Data gauntlet Hook | 🖥 📷 |

PARAMETER STORAGE KEYS
List of parameters accessible in the custom code    ⊞

| Parameter Name | Storage Key | |
|---|---|---|
| e.g. param | e.g. Storage Key | 🗑 |

CUSTOM CODE

```
1  return param
```

RESULT STORAGE KEY e.g. Gauntlet Result

Instruction Type / Hook Type / Data gauntlet

[ CLOSE ]

FIG. 6C

New Instruction
Extract PDF Hook

FILE STORAGE KEY
e.g. Downloaded Pdf File

GET ALL TEXT FROM PDF FILE
☐ YES

GET SPECIFIC TEXT FROM PDF USING COORDINATES
☐ YES

Instruction Type / Hook Type / Extract PDF

[ CLOSE ]

New Instruction
Auth response Hook

AUTHED KEY
e.g. Authed

Instruction Type / Hook Type / Auth response

[ CLOSE ]

FIG. 6D

New Instruction
Bill has balance Hook

STORAGE KEY
e.g. Bill has balance

Instruction Type / Hook Type / Bill has balance

[ CLOSE ]

New Instruction
Bill response Hook

No configuration needed!

Instruction Type / Hook Type / Bill response

[ CLOSE ]

FIG. 7D

Extract the stock price
Extract Handler

STORAGE KEY
Stock Price

TIMEOUT (OPTIONAL)
e.g. 5000

EXTRACT SOURCE OF PAGE
☐ YES

EXTRACT WITH CUSTOM CODE
☐ YES

SELECTOR
.StockPrice

FALLBACK TEXT
Use this when you want to match text that means the selector you're looking for will never appear.
E.g. "No payments yet"
☐ YES

FIG. 7E

Navigate to Q2's page
↓
Extract the stock price

FIG. 7F

Make the stock price fancy 64ms 

[ 02:52:48:555 ] Execute command: 5b1fdb2ddb8dc112ebc60e8d +60ms
[ 02:52:48:556 ] Gauntlet Result: Q2's current stock price is $61.80 +1ms
[ 02:52:48:555 ] Command executed: 5b1fdh2ddb8dc112ebc60e8d +0ms

Extract the stock price 188ms 

[ 02:52:48:308 ] Execute command: 5b1fdb2ddb8dc112ebc60e90 +61ms
[ 02:52:48:308 ] EXTRACT {
   "selector": ".StockPrice",
   "key": "Stock Price"
} +0ms
[ 02:52:48:433 ] Extraction found "61.80" +125ms
[ 02:52:48:433 ] Command executed: 5b1fdb2ddb8dc112ebc60e90 +0ms

Navigate to Q2's page 2456ms 

[ 02:52:45:791 ] Execute command: 5b1fdh2ddb8dc112ebc60e8e +575ms
[ 02:52:45:795 ] NAVIGATE {
   "url": "http://investors.q2ebanking.com/investor-relations/overview/default.aspx",
   "dataSource": "manual-entry"
} +2ms
[ 02:52:48:167 ] Command executed: 5b1fdh2ddb8dc112ebc60e8e +2372ms

FIG. 8

METHOD AND SYSTEM FOR AUTOMATING WEB PROCESSES UTILIZING AN ABSTRACTABLE UNDERLYING PLATFORM LAYER

RELATED APPLICATIONS

This application claims a benefit of priority under 35 U.S.C. 119 of the filing date of U.S. Patent Application Ser. No. 62/690,541 filed Jun. 27, 2018, entitled "METHOD AND SYSTEM FOR AUTOMATING WEB PROCESSES UTILIZING AN ABSTRACTABLE UNDERLYING PLATFORM LAYER", which is fully incorporated herein by reference for all purposes.

TECHNICAL FIELD

This disclosure relates generally to the field of process automation. More specifically, this disclosure relates to systems and methods for process automation in an online environment that use an underlying platform layer. In particular, this disclosure relates to process automation systems that provide the ability to implement website automation application using reusable modules by providing an underlying platform layer compatible with multiple underlying automation platforms to address the challenges around the inefficiencies of swapping underlying automation platform as well as maintaining a large set of diverse automation endpoints.

BACKGROUND

In today's online world, an ever increasing amount of functionality is offered "online". In other words, many websites or other online touchpoints of businesses or other entities offer a great deal of functionality that may be accessed and utilized by users of those websites. This functionality is particularly germane in the context of businesses that offer goods or services in such an online environment. For example, much of the functionality offered through these online sites may be related to the management or access to a user's data, such as their online accounts. Thus, the functionality of entities' websites may pertain to the ability of users to pay their bills, alter their payment information, change their contact information or their preferences related to shipping, or other account management techniques.

Because of the similarity of much of this functionality across various online sites from different entities, users of such online sites may often times wish to accomplish the same, or substantially similar, tasks with respect to many of these online sites. To accomplish these tasks then, traditionally a user was required to access each individual online site for each entity where the user has an account and manually accomplish these tasks with respect to each individual site.

For example, suppose a user cancels a credit card for any of a number of reasons. However, this credit card is the credit card the user uses for his online activity in association with a number of entities (e.g., a credit card kept on file with one or more online merchants or service providers like Amazon, Netflix, etc.). Thus, the user must go onto each individual site (e.g., Amazon.com, Netflix.com, etc.), manually provide authentication information, access his account on each site, and enter his new credit card information on each site. As may be imagined, with the prevalence of online interactions and sites, such tasks may be tedious and time consuming for a user. As but another example, a user may need to access a variety of sites to pay individual bills. The user may have to log into the website of his gas company to pay the gas bill; the water company to pay his water bill; the county web site to pay his tax bill; the electric company to pay the electric bill, etc.

Thus, these examples serve as a microcosm of a larger problem. There are many online tasks or interactions with websites that may be substantially similar across different web sites. It may thus be desirable to substantially automate these tasks for a user. For example, to provide a central location or site where a user may designate a set of web sites (e.g., Amazon, Netflix, etc.), a designated task (e.g., replace credit card information) and any other desired information (e.g., a new credit card number, any user credentials used to access a web site, etc.) and the designated task can be accomplished across the designated web sites for the user.

Accomplishing this automation is, however, not straightforward. While each of the web sites may offer substantially similar functionality to accomplish a task (e.g., each web site may offer the ability to replace or designate a credit card for a registered user) each specific web site may allow the task to be accomplished in slightly (or very) different manners. Specifically, each web site may have a different set of web pages or navigation paths, different interfaces, require different data or differ in other ways to allow a user to accomplish the same task. Moreover, there may be no defined ways of accomplishing the functionality (e.g., interfaces or web services, etc.) except through interaction with the web site itself.

Accordingly, it may be difficult to accomplish the design and implementation of applications for the automation of such tasks, and more generally to automate interactions with websites.

SUMMARY

One way of accomplishing such automation [it] is to construct applications for the automation of such tasks (referred to as robotic process automation systems or applications). These robotic process automation applications may take the form of scripts or programs that define or include code that may be executed by a browser automation tool such as Selenium or Nightmare by Segment.

The robotic process automation system can therefore include an instance of an executing browser and a browser automation tool. An automation application for a task can then be generated by generating code that can be executed by the browser automation tool against the instance of the browser to automate the desired task. In most cases, however, robotic process automation (RPA) systems in regard to websites typically require coding specifically to a single automation platform and browser, such as Selenium/Chrome, or Nightmare/Firefox. As these automation applications are hand-coded for specific platform and browser automation tools, the migration of such tools to a new platform (e.g., of browser automation) or the adjustment of the automation of a task in a rapidly moving ecosystem of robotic process automation tools may be extremely difficult.

Embodiments of the systems and methods presented herein may make use of an abstraction layer comprising of "handlers" that provide a high-level wrapper around specific points of robotic process automation. Instead of using raw coded scripts to interact with a specific robotic process automation platform, a user interface allows a user to build robotically automated processes that conform to the handlers of an abstraction layer. The automation application thus remains vendor and platform agnostic.

Accordingly, embodiment may offer a number of advantages, including improving the maintainability and scalability of a system dealing with thousands of automated processes and increasing the feasibility (e.g., financially or otherwise) of supporting such systems due at least to the drastic decrease in the amount of time and experience required to build, maintain, and deploy these robotically automated processes. Additionally, the flexibility of being able to migrate to an entirely new underlying technology drastically increases the longevity of systems coded according to embodiment of such a proprietary abstraction layer.

In one embodiment, a system for robotic process administration (RPA), includes a data store storing a set of reusable modules, where each module comprises computer executable code for generating browser automation instructions for performing a task at a website using a browser automation platform and a configuration parameter. The system may also provide a designer interface adapted to allow a user to define a first RPA application for a first website. Using the interface a user may select a module from the set of modules, and define a first value for the first website for the configuration parameter, wherein the first RPA application includes a first module definition for the module, the first module definition includes an identifier for the selected module and the first value is defined for the configuration parameter for the selected module.

In this embodiment, an execution engine of the RPA system can execute the first RPA application by creating a first job execution instance for the first RPA application, the first job instance including a first instance of a browser and a first state. The first RPA application can be to determine the first module definition, and the module accessed based on the identifier for the selected module as included in the first module definition of the first RPA application to obtain the computer executable code of the module. First browser automation instructions are generated for a browser automation platform by evaluating the computer executable code of the module against the first value for configuration parameter of the first module definition of the first RPA application to generate the first browser automation instructions. The generated first browser automation instructions can be provided to the browser automation platform for execution against the first website in the first browser instance associated with the first job instance in the execution engine.

In some embodiments, the designer interface is adapted to allow a user to define a second RPA application for a second website by selecting the module from the set of modules, and defining a second value for the second website for the configuration parameter. The second RPA application includes a second module definition for the module, the second module definition includes the identifier for the selected module, and the first value defined for the configuration parameter for the selected module.

In this embodiment, the execution engine of the RPA system can execute the second RPA application by creating a second job execution instance for the second RPA application, the second job instance including a second instance of a browser and a second state. The second RPA application can be used to determine the second module definition, and the module accessed based on the identifier for the selected module as included in the second module definition of the second RPA application to obtain the computer executable code of the module. Second browser automation instructions are generated for the browser automation platform by evaluating the computer executable code of the module against the second value for configuration parameter of the second module definition of the second RPA application to generate the second browser automation instructions. The generated second browser automation instructions can be provided to the browser automation platform for execution against the second website in the second browser instance associated with the second job instance in the execution engine.

In a particular embodiment, the first value for the configuration parameter for the first website is a variable and the execution engine is adapted to determine the first value specific to a first user based on a first context of the first job instance. Additionally, the second value for the configuration parameter for the second website may be the variable and the execution engine is adapted to determine the second value specific to a second user based on a second context of the second job instance.

In embodiments, the module definition comprises a JSON object including the identifier for the module and the first value for the configuration parameter. The first value for the configuration parameter may be associated with the DOM of the first website.

In one embodiment the set of modules includes a handler module, a generator module and a hook module.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIGS. 4A-4G are diagrams illustrating embodiments of interfaces for defining generator modules.

FIGS. 5A-5H are diagrams illustrating embodiments of interfaces for defining handler modules.

FIGS. 6A-6E are diagrams illustrating embodiments of interfaces for defining hook modules.

FIGS. 7A-7F are diagrams illustrating an example of a definition of an RPA application.

FIG. 8 is a block diagram illustrating the output of the execution of an example RPA application.

DETAILED DESCRIPTION

Figure 1:
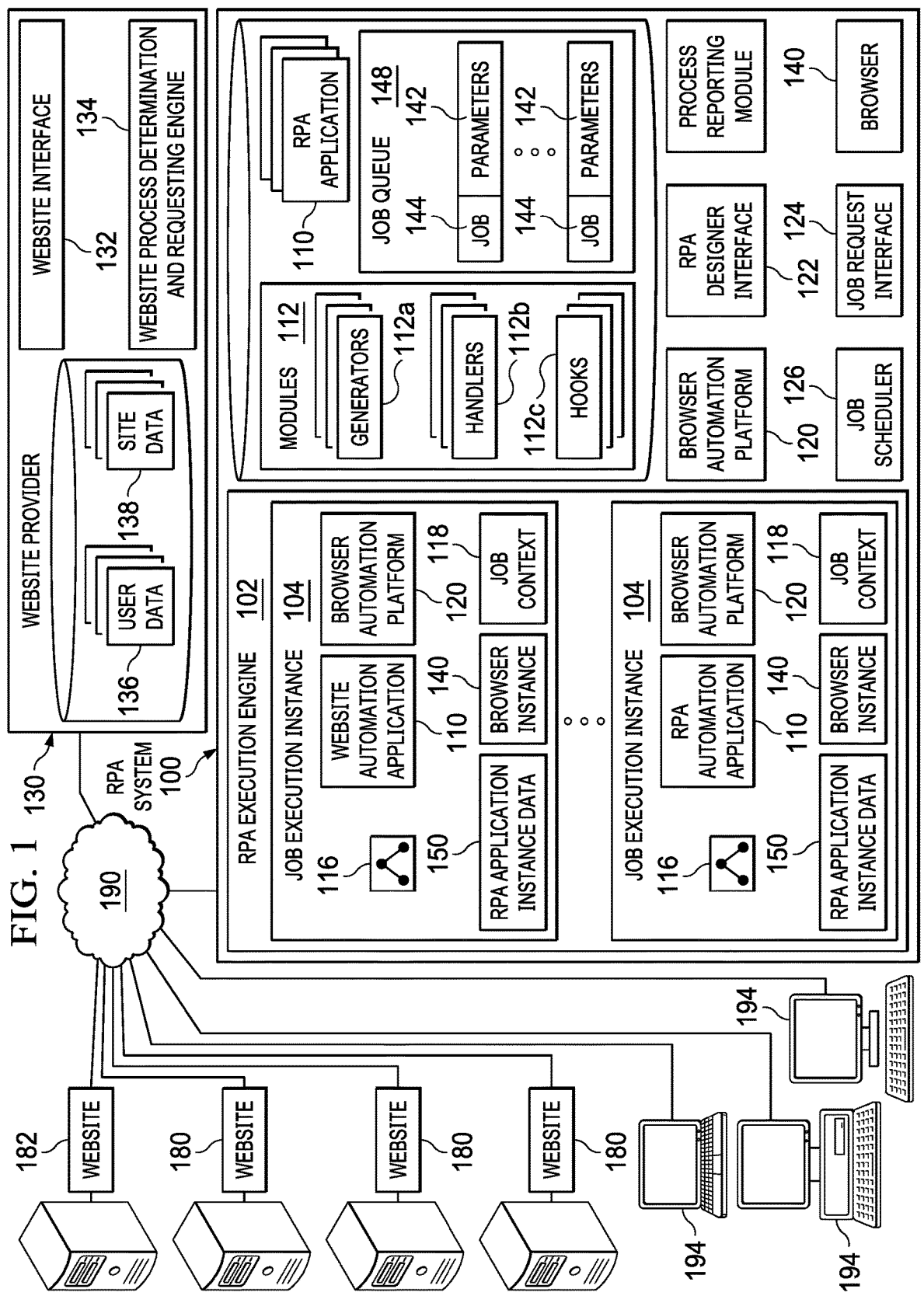
FIG. 1 is a block diagram illustrating one embodiment of a computer network environment including a robotic process automation (RPA) system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements).

Before delving into details regarding various embodiments, some context may be useful. As discussed, in today's online world, an ever increasing amount of functionality is offered "online". In other words, many websites or other online touchpoints of businesses or other entities offer a great deal of functionality that may be accessed and utilized by users of those websites. This functionality is particularly germane in the context of businesses that offer goods or services in such an online environment. For example, much of the functionality offered through these online sites may be related to the management or access to a user's online account. Thus, the functionality of entities' websites may pertain to the ability of users to pay their bills, alter their payment information, change their contact information or their preferences related to shipping, or other account management techniques.

Because of the similarity of much of this functionality across various online sites from different entities, users of such online sites may often times wish to accomplish the same, or substantially similar, tasks with respect to many of these online sites. To accomplish these tasks then, traditionally a user was required to access each individual online site for each entity where the user has an account and manually accomplish these tasks with respect to each individual site.

For example, suppose a user cancels a credit card for any of a number of reasons. However, the cancelled credit card is the credit card the user uses for his online activity in association with a number of entities (e.g., a credit card kept on file with one or more online merchants or service providers like Amazon, Netflix, etc.). Thus, the user must go onto each individual site (e.g., Amazon.com, Netflix.com, etc.), manually provide authentication information, access his account on each site, and enter his new credit card information on each site. As may be imagined, with the prevalence of online interactions and sites, such tasks may be tedious and time consuming for a user. As but another example, a user may need to access a variety of sites to pay individual bills. The user may have to log into the website of his gas company to pay the gas bill; the water company to pay his water bill; the county web site to pay his tax bill; the electric company to pay the electric bill, etc.

Thus, these examples serve as a microcosm of a larger problem. There are many online tasks or interactions with websites that may be substantially similar across different web sites. It may thus be desirable to substantially automate these tasks for a user. For example, to provide a central location or site where a user may designate a set of web sites (e.g., Amazon, Netflix, etc.), a designated task (e.g., replace credit card information, pay a bill) and any other desired information (e.g., a new credit card number, any user credentials used to access a web site, etc.) and the designated task can be accomplished across the designated web sites for the user.

Accomplishing this automation is, however, not straightforward. While each of the web sites may offer substantially similar functionality to accomplish a task (e.g., each web site may offer the ability to replace or designate a credit card for a registered user or pay a bill) each specific web site may allow the task to be accomplished in slightly (or very) different manners. Specifically, each web site may have a different set of web pages or navigation paths, different interfaces, require different data or differ in other ways to allow a user to accomplish the same task. Moreover, there may be no other way to accomplish that task. In other words, the web site may not offer an Application Programming Interface (API) or a web services call to accomplish the task; the task may only be accomplished directly through interaction with the pages of the web site itself.

Accordingly, it may be difficult to accomplish the automation of such tasks with respect to one or more web sites. One way of accomplishing such automation is to construct applications for the automation of such tasks (referred to as robotic process automation systems or applications). These robotic process automation applications may take the form of scripts or programs that define or include code that may be executed by a browser automation tool such as Selenium, Electron, Nightmare, Puppeteer, or the like.

The robotic process automation system can therefore include an instance of an executing browser and a browser automation tool. An automation application for a task can then be generated by manually generating code that can be executed by the browser automation tool against the instance of the browser to automate the desired task. In most cases, however, robotic process automation (RPA) systems typically require coding specifically to a single automation platform and browser combination, such as Selenium/Chrome, or Nightmare/Firefox. As these automation applications are hand-coded (i.e., manually) for specific platform and browser automation tools, the migration of such tools to a new platform (e.g., of browser automation) or the adjustment of the automation of a task in a rapidly moving ecosystem of robotic process automation tools may be extremely difficult.

Accordingly, embodiments herein may provide improved RPA systems and methods that utilize a set of reusable modules, each of the modules providing a high-level wrapper around a specific point or task associated with an automated interaction. These modules may include an associated set of configurable parameters and be associated with instructions for a browser automation platform (e.g., Puppeteer, Selenium, Nightmare.js, Electron, etc.). In one embodiment, these modules may include a set of handler modules, a set of generator modules and a set of hook modules. Handler modules may be associated with basic or atomic interactions with websites such as clicks, selecting (e.g., from a menu), waiting, inputting data, capturing a portion or region of a web page, downloading content, etc. Hook modules may be modules for exchanging data between a website and the RPA system or a data store associate therewith, or for otherwise taking action at the RPA system based on the result of an interaction with the website. Generator modules may be a predefined module for accomplishing a more complex interaction with a website, and may be a predefined composite or ordering of handler or hook modules. Generator modules may be associated with, for example, authentication with a web site, Captcha, saving cookies associated with the web site, etc.

A user of the RPA system may utilize the set of modules provided by the RPA system to construct an RPA application to accomplish a task at a target website. Specifically, in one embodiment a user may use a designer interface (e.g., a graphical user interface (GUI) or the like) of the RPA system to select modules from the set of modules offered by the RPA system, configure those identified modules according to the target website for which it is desired to automate the task and link the configured identified modules to define an order of evaluation or execution of the modules. When the user is done, the defined RPA application may be saved. The RPA application may, for example, be saved in a manner whereby it is associated with a specific task and website, which may be defined by the user through the designer interface. The RPA application may include a definition for each module as defined by the user and an ordering or linking of those modules. The definition for a module may include an identification of the module and any configuration parameters for any configurable parameters of the module.

These RPA applications may be evaluated or executed by an RPA execution engine at the RPA system. When an RPA application associated with a target website is executed, the RPA execution engine may create a job execution instance for that instance of the execution of that RPA application, where the job execution instance may have an associated executing instance of a browser. For the job execution instance, the RPA execution engine may evaluate the RPA application by evaluating the identified modules in the order defined based on the configuration parameters.

Specifically, in one embodiment the RPA execution may evaluate an identified module by determining instructions for a browser automation platform for the identified module and configuring the browser automation platform instructions for the module according to any configuration for associated parameters as defined in the definition of the module in the RPA application to generate a set of browser automation platform instructions specific to that job instance and module as defined in the RPA application. These browser automation platform instructions can then be provided to the browser automation platform to execute against the browser instance for the job execution instance. The RPA execution engine may maintain a state for the job execution instance such that based on the results of a previously executed module of the RPA application associated with the job instance a next identified module can be selected based on the results of the previously executed identified module and the RPA application of the job instance. This next identified module can then be evaluated by the RPA execution instance in the same manner.

Accordingly, by defining RPA applications that rely on these types of modules, instead of using raw coded scripts, to interact with a specific robotic process automation platform, a user is allowed to build a robotically automated processes using an abstraction layer. The automation application thus remains vendor and platform agnostic. Embodiments may thus offer a number of advantages, including improving the maintainability and scalability of a system dealing with thousands of automated processes and increasing the feasibility (e.g., from a computer resource or cost perspective, or otherwise) of supporting such systems due at least to the drastic decrease in the amount of time and experience required to build, maintain, and deploy these robotically automated processes. Additionally, the flexibility of being able to migrate to an entirely new underlying browser automation platform drastically increases the longevity of systems based on, and applications defined according to, embodiments of such RPA systems and methods.

The RPA systems and methods provided by embodiments as disclosed may thus be usefully leveraged by providers of web sites to a variety of ends. For example, an intermediary website or a service provider website may utilize an RPA system in providing a single website to allow a user to accomplish a single task across a variety of websites. To illustrate using examples given above, a website provider such as an online financial services provider or online banking institution may desire to offer functionality on its website whereby the user may perform a designated task such as pay a bill or change credit card information across a set of identified or designated set of web sites (e.g., Netflix, Hulu, the gas company, etc.). The website provider may thus desire to act as an intermediary for users of the website such that the user can accomplish this task across the identified or designated set of web sites without having to access each of these designated websites directly and navigate each of the websites to accomplish the desired task.

These types of websites (e.g., websites that desire to serve as intermediary websites) may thus utilize an embodiment of an RPA system as discussed. Specifically, a user associated with the intermediary web site may access the RPA system to design an associated RPA application for each combination of task and target website that the intermediary website wishes to provide on its website. To return to the example of swapping a credit card, suppose the intermediary website wishes to offer the ability to swap a credit card number at the Netflix website, the Amazon website and the Southwest Gas website. In this example, the user associated with the intermediary website may design three RPA applications each associated with the card swap task, one RPA application associated with Netflix, one RPA application associated with Amazon and one RPA application associated with Southwest Gas. When defining the parameters of the modules comprising the defined RPA application, the user may configure such parameters using variable names associated with a defined context that will accompany any execution of that RPA application.

As a user interacts with the intermediary (or front end) website, when the front end website determines that a task for a particular target website is to be accomplished for that user, the front end website may send a job request to the RPA system identifying the task, the target website, the user of the front end website and any job parameters (e.g., a new credit card number for the user). When the RPA system receives a job request, it can queue this job request at the RPA system. Again, the queued job request may identify the task, the target website, the user of the front end website and any associated job parameters.

The RPA system may have a job scheduler that dequeues job requests from the job queue and identifies an RPA application associated with the job based on the task and website associated with the job (or the frontend website associated with the job request). The RPA application, and associated identification or the user and any job parameters may be passed to the RPA execution engine. The RPA execution engine may create a job execution instance for that instance of the execution of that RPA application, where the job execution instance may have an associated executing instance of a browser as discussed.

Additionally, the RPA execution engine may utilize the identification of the user (or the associated front end website) to access user data or other data associated with the front end website to populate the context variables for that job instance. In other words, the variable names associated with the defined context may be assigned specific values of the obtained user or other data associated with the front end website. The RPA execution engine may then evaluate the RPA application by evaluating the identified modules in the order defined based on the configuration parameters of those modules as discussed by determining instructions for a browser automation platform for the identified module where those browser automation platform instructions are specific to that job instance (e.g., for that user, task and website) and module as defined in the RPA application. These browser automation platform instructions can then be provided to the browser automation platform to execute against the browser instance for the job execution instance.

The RPA execution engine may maintain a state for the job execution instance such that based on the results of a previously executed module of the RPA application associated with the job instance a next identified module can be selected based on the results of the previously executed identified module and the RPA application of the job instance. This next identified module can then be evaluated by the RPA execution instance in the same manner. When the RPA application has been executed, or as the RPA application is being executed, the RPA execution engine may return results to the job scheduler which saves the results in association with the original job such that the results can be returned to the front end website in response to the original job request. The front end website can use these results in the presentation of the front end website to the user (e.g., the results may be returned to the user or the user prompted for another interaction).

It may now be useful to discuss one particular embodiment of an RPA system used in association with a front end website. It will be understood that while certain embodiments of RPA systems as disclosed and illustrated herein may be used in association with a front end website (or multiple front end web sites) and may be tightly integrated with such front end web sites, other embodiments of RPA systems may be utilized for other purposes or in other computer architectures or topologies and may, or may not be, utilized by front end websites without loss of generality.

Turning then to FIG. 1, one embodiment of a distributed network computing topology that includes one embodiment of an RPA system 100 is depicted. The RPA system 100 may be utilized to design, save and execute automated process that may automate one or more tasks with respect to websites 180 accessible over network 190, which may be, for example, the Internet, and intranet, a Local Area Network (LAN), a Wide Area Network (WAN), a wired, wireless or cellular network or almost any type or combination of computing network or networks. RPA system 100 may comprise a set of reusable modules 112, each of the modules 112 providing a high-level wrapper around a specific point or task associated with an automated interaction.

These modules 112 may include an associated set of configurable parameters and be associated with, or comprise, instructions for a browser automation platform 120 (e.g., Puppeteer, Selenium, Headless Chrome, Nightmare.js, Electron, etc.) used by the RPA system 100, or that may be used to produce such instructions. One or more browser automation platforms 120 may be utilized by the process automation system 100. Specifically, modules 112 may include, or be associated with, code or instructions according to the browser automation platform 120 for automating an interaction with a website 180 and may be the building blocks for an RPA application 110. Each module 112 may include its own code base (e.g., code in a robotic process automation (RPA) instruction set or code that utilizes interfaces, classes, method, etc. provided by the browser automation platform 120).

A subset of these modules 112 may include a set of intelligent modules that allow the handling of certain circumstances that may be encountered as an RPA application 110 is executed. An intelligent module 112 may allow the RPA system 100 to handle a variety of circumstance that the RPA application 100 may encounter as it is executed. An example of an intelligent handler would be a click handler that can attempt three variants of clicking an element using a "race" approach. Whether a programmatic Javascript click is sufficient, or if it needs to be an actual mouse click that emits the associated Javascript events can be deduced by attempting multiple approaches at once and seeing which approach is the first to successfully give the desired result.

Modules 112 may be defined using a module configuration to further reduce the amount of coding or expertise needed by users building RPA application 110. These configurations may be controls that are automatically translated to the underlying automation layer without needing to maintain browser automation platform 120 specific logic. By building RPA applications 110 on such modules 112, these modules 112 may be updated or migrated to different browser automation platforms 120 without disturbing or altering the definition of the RPA application 110 in turn allowing the easy migration or updating of all RPA application 110 that utilize such modules 112 without altering the RPA application 110 itself.

In one embodiment, these modules 112 may be grouped into three categories: generators, handlers and hooks. These may be methods (e.g., functions), or a set of methods that accept configuration parameters, and return instructions that can be consumed by a browser automation platform 120. Specifically, these modules 112 may include a set of handler modules 112b, a set of generator modules 112a and a set of hook modules 112c. Handler modules 112b may be associated with basic or atomic interactions with websites such as navigating to a particular URL, clicks, selecting (e.g., from a menu), waiting, inputting data, capturing or extracting a portion or region of a web page, seeing if a URL includes a string or if an element is visible on a page, executing JavaScript in the browser, downloading content, changing a selected iframe in a web page, or others.

Hook modules 112c may be modules for exchanging data between a website and the RPA system or a data store associated therewith, or for otherwise taking action at the RPA system based on the result of an interaction with the website. Hooks 112c may be integrated with various handlers or generators and include logic to interact with the result or other data obtained from the handler such as to save data or defining which action or module 112 to execute subsequently. Hook modules 112c may be associated with, for example, accessing and manipulating storage (e.g., at the RPA system 100 or at an associated computing system such as user data maintained at a website provider), extraction of data from a .pdf document, sending authentication responses, querying a database, send a response containing, marking a task as complete, deciding a next instruction based on a condition, executing a group of instructions, specifying a module as completed, or others.

Generator modules 112a may a predefined module for accomplishing a more complex interaction with a website, and may be a predefined composite or ordering of handler or hook modules. Generator modules 112a may be associated with, for example, authentication with a web site, confirming that an authentication failed or was successful, detection if autopayment is enabled on a website, handling messages for an account at a website, navigation of multiple accounts at a website, dealing with billing data, waiting for human approval, continuing a payment, making a payment, navigating payment paths in a website, handling security inputs, Captcha, saving cookies associated with the web site, detecting and dismissing advertisements, marking a payment method as failed, or others.

RPA designer interface 122 may allow a user of the RPA system 100 (e.g., at a user device 194) to define one or more RPA applications 110. In particular, a user of the RPA system 100 may utilize the designer interface to select, configure and order the set of reusable modules 112 provided by the RPA system to construct an RPA application 110 to accomplish a task at a target website 180. A user may access the process automation system 100 through RPA designer interface 122 (e.g., a graphical user interface) provided by the RPA system 100. The graphical interface may present a set of icons for modules 112. The user may use the graphical user interface to select the appropriate modules 112 and define the interactions between these modules 112 in order to define an RPA application 110. The definition for the RPA application 110 may thus include a definition comprising a set of configured modules 112 and a decision tree defining the order and interaction between the modules 112.

In one embodiment, the user's interaction with the interface 122 may provide at least a portion of the configuration needed (e.g., the inputs) to customize modules 112 to a specific website's document object model. The user may thus select a desired module 112 using the interface 122, a configuration interface for the selected module 112 can then be presented through the designer interface 122 where the configuration interface is associated with the selected module 112 and provides the ability for the user to provide configuration parameters for the module 112 associated with the target website 180. These configuration parameters may, in some instances, be derived from the DOM of the target website 180 or web pages thereof. In this manner a user can analyze the DOM of the target website 180 and provide the configuration parameters for the selected module 112 associated with the target website 180 through the designer interface 122.

Accordingly, a user may use the designer interface 122 of the RPA system 100 to select modules 112 from the set of modules 112 offered by the RPA system 100, configure those identified modules 112 according to the target website 180 for which it is desired to automate a task and link the configured identified modules 112 to define an order of evaluation or execution of the modules 112. As the user builds an RPA application 110 a configuration for each module 112 in the definition defined in the interface 122 by the user, including the execution order relative to other instructions in the decision tree can be stored. When the user is done, the defined RPA application 110 may be saved by the user. The RPA application 110 may, for example, be saved in a manner whereby it is associated with a specific task and website 180, which may be defined by the user through the designer interface 122. The RPA application 110 may include a definition for each module as defined by the user through the designer interface 122 and a definition of the ordering or linking of those modules. The definition for a module may include an identification of the module (e.g., an alphanumerical identifier or the like associated with a module 112) and any configuration parameters for any configurable parameters of the module 112. In one embodiment, the definition for a module is an RPA application 110 may be JavaScript Object Notation (JSON) object including the identification of a corresponding code module (e.g., an alphanumerical identifier or the like associated with a module 112) and values for any configuration parameters of the module 112.

These RPA applications 110 may be evaluated or executed by the RPA execution engine 102 to define calls or other interactions to a browser automation platform 120 such that the browser automation platform 120 can interact with an executing instance of a browser to automate the task as defined by the RPA application 110. When an RPA application 110 associated with a target website 180 is executed, the RPA execution engine 102 may create a job execution instance 104 for that instance of the execution of that RPA application 110, where the job execution instance 104 may have an associated executing instance of a browser 140. In one embodiment the job execution engine 102 may be running in association with an Amazon Lambda or other process execution service, such the code for a job thread instance 104 can be invoked on demand when it is desired to create a job execution instance 104.

For the job execution instance 104, the RPA execution engine 102 may evaluate the RPA application 110 by evaluating the modules 112 identified in the RPA application 110 in the order defined based on the configuration parameters for that module 112 as stored in the module definition of the RPA application 110. Specifically, in one embodiment the RPA execution engine 102 may evaluate a module 112 identified in the RPA application 110 by obtaining the model definition for that module 112 in the RPA application 110 (e.g., the JSON object identifying the module and including configuration parameters for the module). Using the identifier for the module 112 as included in the module definition, instructions for a browser automation platform 120 for the identified module 112 may be determined. These browser automation platform instructions for the module can then be configured according to any configuration for associated parameters as defined in the definition of the module in the RPA application 110 to generate a set of browser automation platform instructions specific to that job instance 104 and module 112 as defined in the RPA application 110. For example, the code of the module 112 may be configured by, or executed against the, corresponding JSON object of the module definition of the RPA application to determine the browser automation platform instructions. These determined browser automation platform instructions can then be provided to the browser automation platform 120 to execute against the browser instance 140 for the job execution instance 104.

During execution of the RPA application 110, the data returned from the execution of the job instance 104, the websites 180 interacted with or other data associated with the execution of the RPA application 110 may be stored as automation application data 150. Additionally, the RPA execution engine 102 may maintain a state 116 for the job execution instance 104 such that based on the results of a previously executed module defined in the RPA application 110 associated with the job instance 104 a next identified module in the RPA application 110 can be selected based on the results of the previously executed identified module and the RPA application 110 of the job instance 194. This next identified module can then be evaluated in the job execution instance 104 in the same manner.

Accordingly, by defining RPA applications 110 that rely on these types of reusable modules 112, instead of using raw coded scripts to interact with a specific robotic process automation platform, a user is allowed to build a robotically automated processes using an abstraction layer. The RPA applications 110 thus remains vendor and platform agnostic. Embodiments may thus offer a number of advantages, including improving the maintainability and scalability of a system dealing with thousands of automated processes and increasing the feasibility (e.g., from a computer resource or cost perspective, or otherwise) of supporting such systems due at least to the drastic decrease in the amount of time and experience required to build, maintain, and deploy these robotically automated processes. Additionally, the flexibility of being able to migrate to an entirely new underlying browser automation platform drastically increases the longevity of systems based on, and applications defined according to, embodiments of such RPA systems and methods.

The RPA system 100 provided by embodiments as disclosed may thus be usefully leveraged by providers of web sites to a variety of ends. For example, frontend website provider 130 may provide a website 182 that may allow a user at a computing device 194 to interact with and perform certain functionality. The front end website provider 130 may thus maintain user data 136 associated with users of the website 182 and other site data 138 related to the operation of the site, users of the site or other type of data. For example, if the front end website 182 is a financial service provider or banking institution user data 136 or site data 138 may include data on credit card numbers, dates or codes, account information, user names, card brands, or other banking or credit related information.

Front end website 182 may also provide functionality that allows a user at a computing device 194 to accomplish a single task across a variety of (e.g., non-affiliated) websites 180 through website 182 without that user having to directly access the websites themselves 180. To illustrate using examples given above, website provider 130 could be an online financial services provider or online banking institution that may desire to offer functionality on its website whereby the user may perform a designated task such as pay a bill or change credit card information across a set of identified or designated set of web sites 180 (e.g., Netflix, Hulu, the gas company, etc.). The front end website provider 130 may thus desire to act as an intermediary for users such that the user can accomplish this task across the identified or designated set of web sites 180 without having to access each of these designated websites 180 directly and navigate each of the websites 180 to accomplish the desired task.

These types of website providers (e.g., with websites 182 that serve as front end websites) may thus utilize an embodiment of an RPA system 100. Specifically, a user associated with the front end website provider 130 may access the RPA system 100 (e.g., using the designer interface 122) to design an associated RPA application 110 for each combination of task and target website 180 that the front end website provider 130 wishes to provide on its website 182. As the front end website provider 130 and the RPA system 100 may be affiliated with one another, or be part of the same enterprise or entity in some cases, when defining the parameters of the modules 112 comprising the defined RPA application 110, in some embodiments the user may configure such parameters using variable names associated with a defined context that will accompany any execution of an RPA application 110. Examples of variable names and the associated data are given in Appendix A.

To return to the example of swapping a credit card, suppose the front end website provider 130 wishes to offer the ability to swap a credit card number at the Netflix website 180, the Amazon website 180 and the Southwest Gas website 180 through the front end website 182. In this example, the user associated with the front end website provider 130 may design three RPA applications 110 using designer interface 122, each RPA application 110 associated with the card swap task, one RPA application 110 associated with the Netflix website 180, one RPA application 110 associated with Amazon website 180 and one RPA application 110 associated with Southwest Gas website 180.

Specifically, the front end website provider 130 may provide a website 182 that interacts with a website interface 132 to request that a specific task (e.g., pay a bill or change credit card information) be accomplished with respect to one or more designated websites 180 and to provide any associated information with the task being requested by the user. Based on a user's interaction with the website 182, a website process determination and requesting engine 134 may determine that a particular task is to be accomplished with respect to one or more websites 180. When the website process determination and requesting engine 134 determines that a task for a particular target website 180 is to be accomplished for that user, the website process determination and requesting engine 134 may send a job request to the RPA system 100 through job request interface 124, where the request may identify the task, the target website 180, the user of the front end website 182 (e.g., who initiated the task for target website 180 using front end website 182) and any job parameters (e.g., a new credit card number for the user).

When the RPA system 100 receives a job request through job request interface 124, it can queue this job request at the RPA system 100 as a job 144 in a job queue 148. The queued job request 144 may identify the task, the target website, the user of the front end website and any associated job parameters 142. In one embodiment, the job queue 148 may be stored in a Mongo database collection.

The RPA system 100 may have a job scheduler 126 that dequeues jobs 144 from the job queue 148 and identifies an RPA application 110 associated with the job 144 based on the task and website associated with the job 144 (or the frontend website provider 130 associated with the job 144). The RPA application 110, and associated identification of the user and any other job parameters 142 may be passed to the RPA execution engine 102. The RPA execution engine 102 may create a job execution instance 104 for that instance of the execution of that RPA application 110, where the job execution instance 104 may have an associated executing instance of a browser 140 as discussed. Additionally, the RPA execution engine 102 may utilize the identification of the user (or the associated front end website 130) to access user data 136 or other data 138 (e.g., associated with the front end website provider 130) to populate the context variables 118 for that job instance 104. In other words, the variable names associated with the defined context may be assigned specific values for the obtained user or other data associated with the front end website 130 and those variable names and associated user specific values provided as the context 118 of the job instance 104.

The RPA execution engine 102 may then evaluate the RPA application 110 by evaluating the identified modules of the RPA application 110 in the order defined based on the configuration parameters of those modules in the module definition in the RPA application by determining instructions for the browser automation platform 120 for the identified module where those browser automation platform instructions are specific to that job instance (e.g., for that user, task and website) and module as defined in the RPA application 110. These browser automation platform instructions can then be provided to the browser automation platform 120 to execute against the browser instance 140 for the job execution instance 104. The RPA execution engine 102 may maintain the state 116 for the job execution instance 104 such that a next identified module of the RPA application 110 can be selected based on the results of the previously executed identified module and the RPA application 110 of the job instance 104.

This next identified module can then be evaluated by the job execution instance 104 in the same manner. When the RPA application 110 has been executed, or as the RPA application 110 is being executed in the job execution instance 104, the RPA execution engine 102 may return results to the job scheduler 126 which saves the results in association with the original job 144 such that the results of the execution of the RPA application 110 can be returned to the front end website provider 130 in response to the original job request received at the job request interface 124. The front end website provider 130 can use these results in the presentation of the front end website 182 to the user (e.g., the results may be returned to the user or the user prompted for another interaction).

Figure 2:
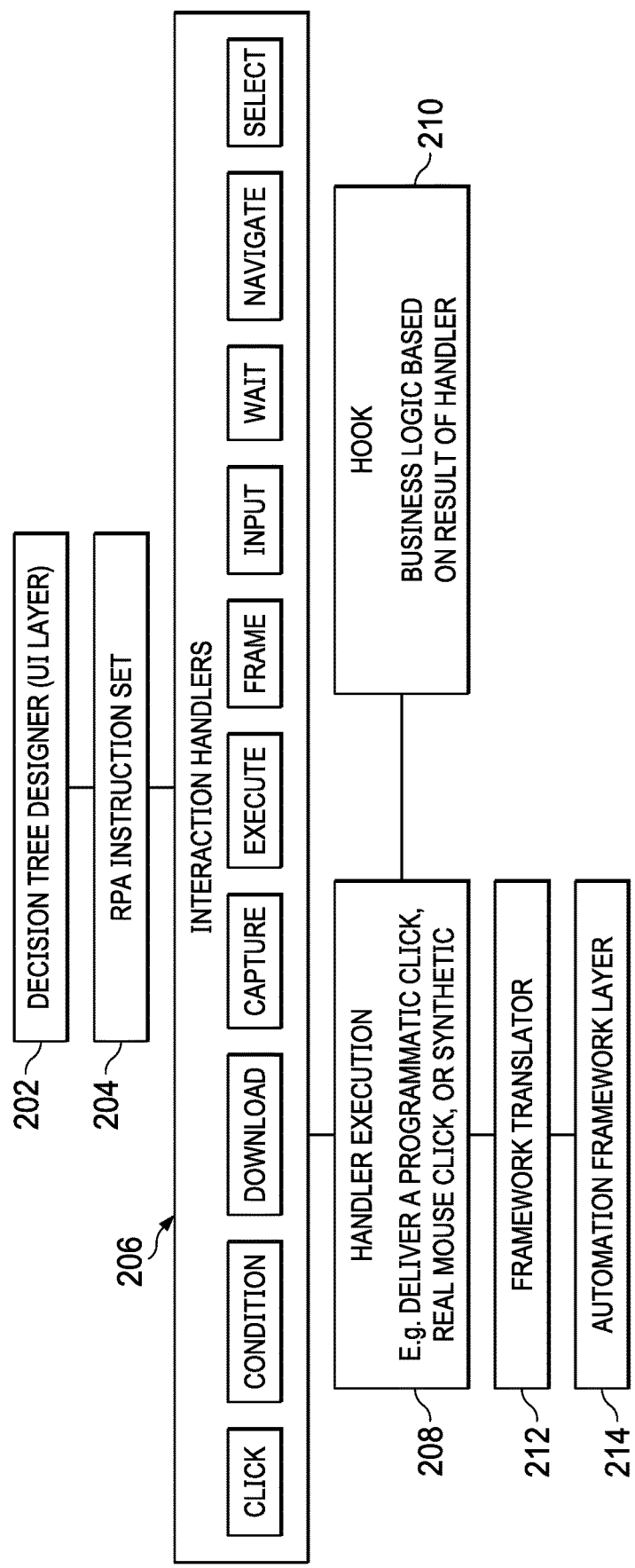
FIG. 2 is a block diagram illustrating one embodiment of an architecture of RPA application design and execution.

It may now be useful to discuss specific implementations and embodiments in more detail. Moving then to FIG. 2, one embodiment of an architecture of RPA application design and execution is depicted. The designer layer 202 may be implemented as a web based application such as JavaScript or the like that allows a user to construct an RPA application as discussed. In one embodiment, instead of directly using code, a user can choose from a set of well-defined modules, broken into the three categories of handlers, generators and hooks as discussed. These modules may include a set of pre-defined code modules that include or utilize an RPA instruction set 204 for defining modules in the RPA application. An RPA instruction set 204 may be the sum output of both the configurations setup via the designer interface.

Once an RPA application is defined using the RPA instruction set 204 it may be executed at a later point. This execution may be accomplished by identifying the interaction handler module 206 associated with the identified modules in the RPA application and executing them 208, while providing the input or output as defined in the hooks 210. The execution of the handlers 208 may, in turn, be accomplished by determining instructions for the browser automation framework 214 by a framework translator 212. The framework translator may access the browser automation platform instructions for a handler to configure those browser automation platform instructions specific to that job instance (e.g., for that user, task and website). These browser automation platform instructions can then be provided to the automation framework 214 to execute against a browser instance.

It may now be useful to an understanding of certain embodiments to depict examples of interfaces that may be utilized by an RPA system for designing an RPA application by selecting modules and configuring the parameters of such modules. Looking first then to FIG. 3, one embodiment of an interface that may be presented by a designer interface to allow a user to select a type of module for an RPA application being built is depicted. Here, the interface may allow a user to select a type of module to be included in the RPA application being designed: a generator module 304, a handler module 306 or a hook module 308.

Figure 4A:
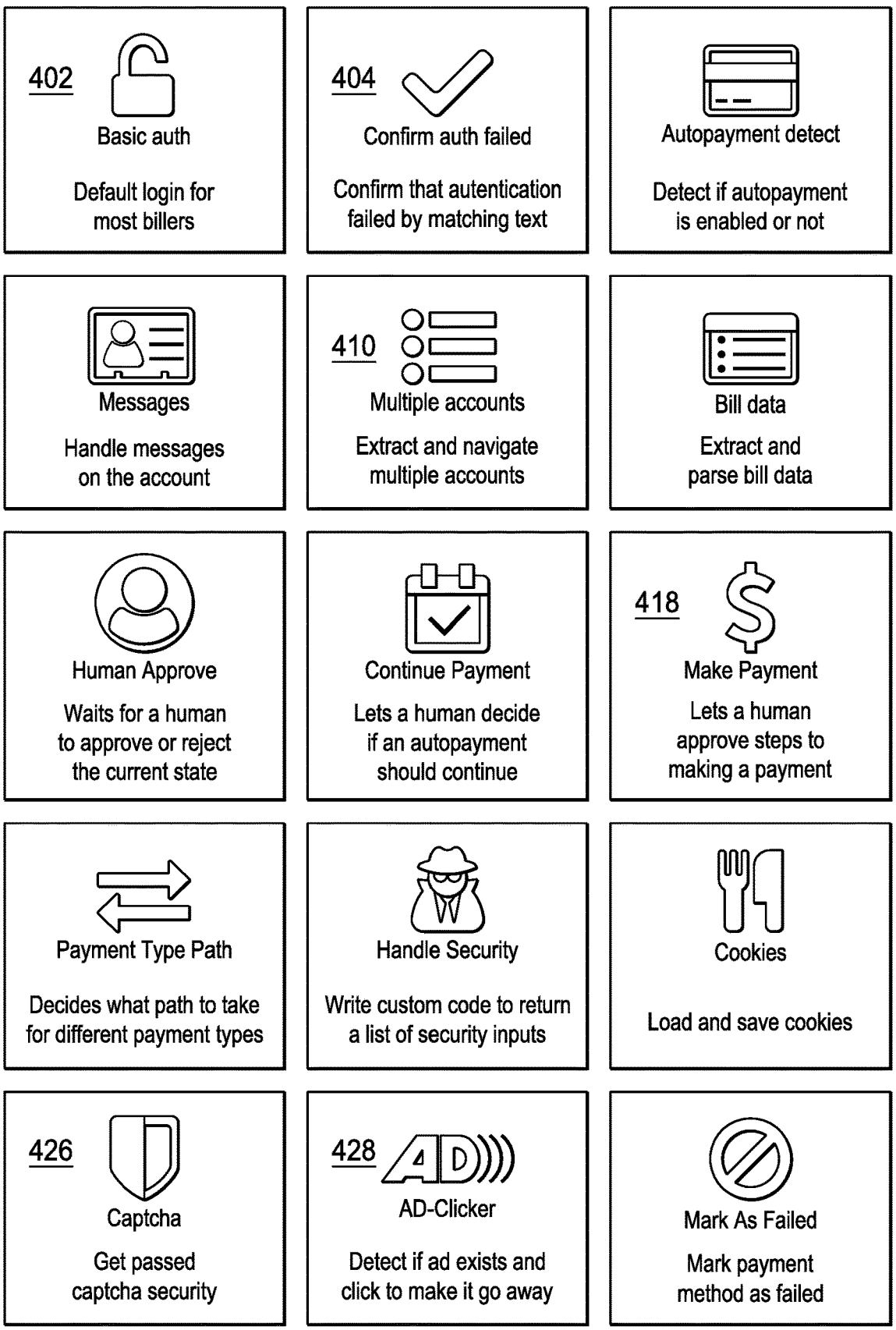

Once the user selects a particular type of module an interface allowing a user to select a particular one of those types of modules may be presented by the designer interface. FIG. 4A depicts an embodiment of interface that may be presented by a designer interface for selection of a generator module for inclusion in an RPA application. Once a user has selected a specific module for inclusion in the RPA application being built, an associated interface for the configuration of any parameters associated with the selected module may be presented to the user by the designer interface to allow the user to configure values for those partakers for that module with respect to the RPA application being built.

Figure 4C:

As an example of these types of interfaces, FIG. 4B depicts one embodiment of an interface for configuring the parameters of a basic authentication module for an RPA application when a user selects the "Basic auth" module 402 in the interface of FIG. 4A. FIG. 4C depicts one embodiment of an interface for configuring the parameters of a make payment module for an RPA application when a user selects the "Make Payment" module 418 in the interface of FIG. 4A. FIG. 4D depicts one embodiment of an interface for configuring the parameters of a multiple accounts module for an RPA application when a user selects the "Multiple accounts" module 410 in the interface of FIG. 4A. FIG. 4E depicts one embodiment of an interface for configuring the parameters of a Confirm authentication failed module for an RPA application when a user selects the "Confirm auth failed" module 404 in the interface of FIG. 4A. FIG. 4F depicts one embodiment of an interface for configuring the parameters of a Captcha module for an RPA application when a user selects the "Captcha" module 426 in the interface of FIG. 4A, and FIG. 4G depicts one embodiment of an interface for configuring the parameters of an advertisement clicker module for an RPA application when a user selects the "Ad-Clicker" module 428 in the interface of FIG. 4A.

Figure 3:
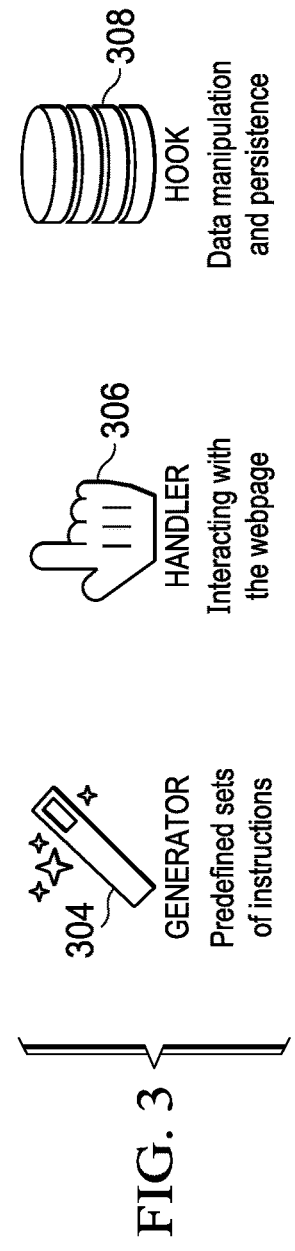
FIG. 3 is a block diagram illustrating one embodiment of an interface for defining a type of module.
Figure 5A:
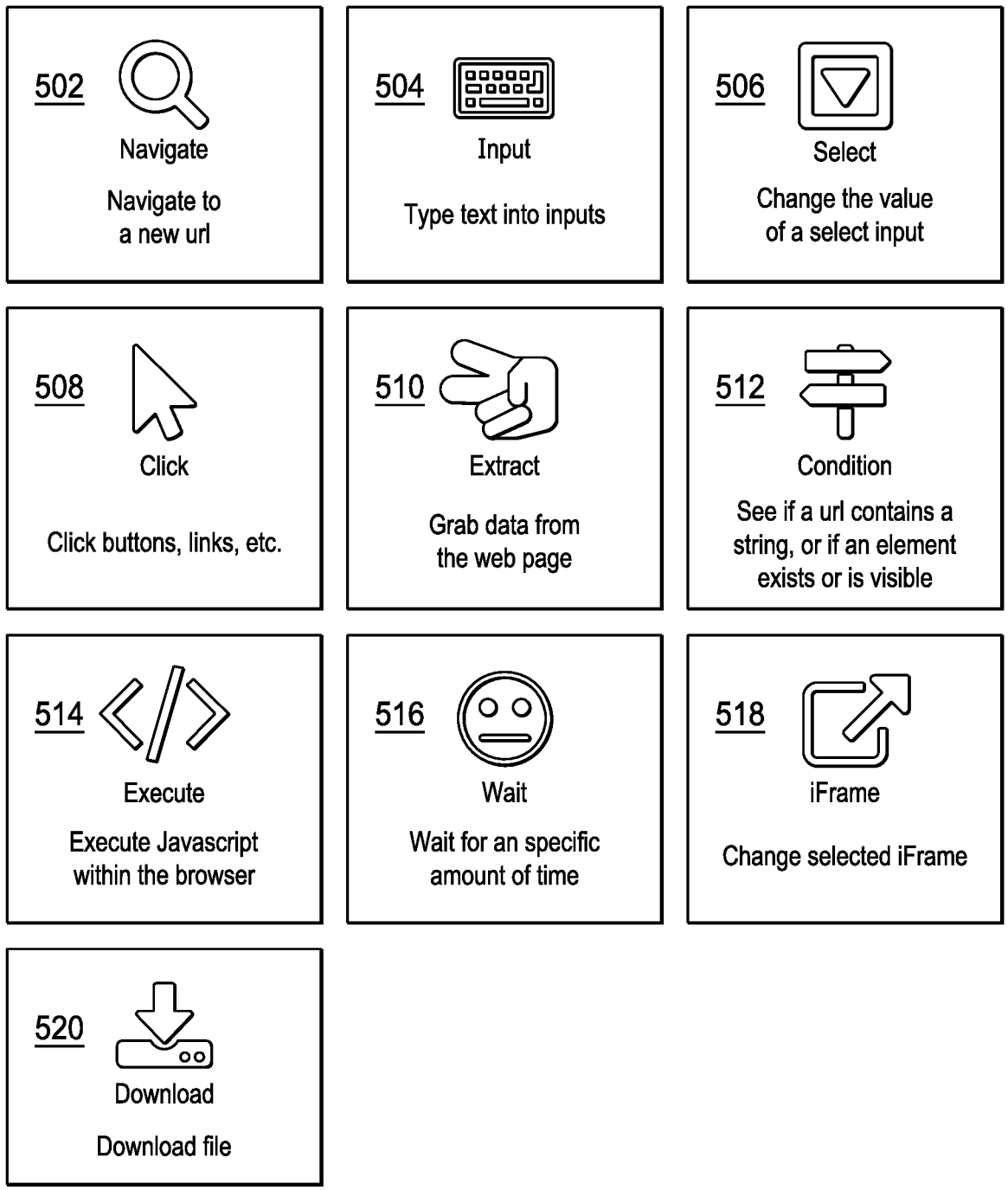

FIG. 5A depicts an embodiment of interface that may be presented by a designer interface for selection of a handler module for inclusion in an RPA application (e.g., once the user has selected a "Handler" module in the interface of FIG. 3). Again, once a user has selected a specific module from the interface of FIG. 5A for inclusion in the RPA application being built, an associated interface for the configuration of any parameters associated with the selected module may be presented to the user by the designer interface to allow the user to configure values for those parameters for that module with respect to the RPA application being built.

Figure 5D:
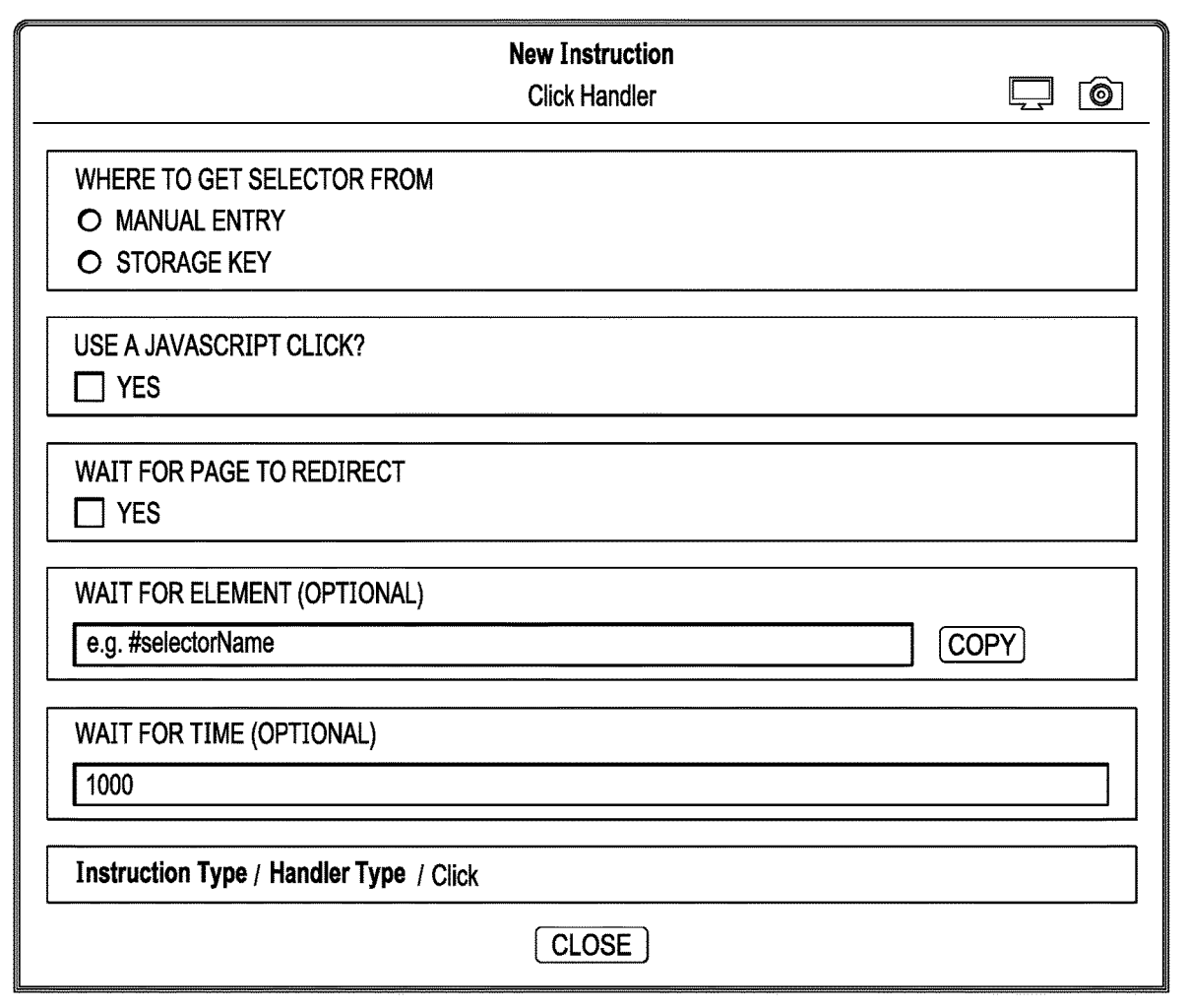

Here, FIG. 5B depicts one embodiment of an interface for configuring the parameters of a navigation module for an RPA application when a user selects the "Navigate" module 502 in the interface of FIG. 5A. FIG. 5C depicts one embodiment of an interface for configuring the parameters of a input module for an RPA application when a user selects the "Input" module 504 in the interface of FIG. 5A and one embodiment of an interface for configuring the parameters of a select module for an RPA application when a user selects the "Select" module 506 in the interface of FIG. 5A. FIG. 5D depicts one embodiment of an interface for configuring the parameters of a click handler module for an RPA application when a user selects the "Click" module 508 in the interface of FIG. 5A. FIG. 5E depicts one embodiment of an interface for configuring the parameters of a extract module for an RPA application when a user selects the "Extract" module 510 in the interface of FIG. 5A.

Figure 5G:

FIG. 5F depicts one embodiment of an interface for configuring the parameters of a condition handler module for an RPA application when a user selects the "Condition" module 512 in the interface of FIG. 5A and one embodiment of an interface for configuring the parameters of an execute module for an RPA application when a user selects the "Execute" module 514 in the interface of FIG. 5A. FIG. 5G depicts one embodiment of an interface for configuring the parameters of a wait module for an RPA application when a user selects the "Wait" module 516 in the interface of FIG. 5A and one embodiment of an interface for configuring the parameters of an iFrame module for an RPA application when a user selects the "iFrame" module 518 in the interface of FIG. 5A, and FIG. 5H depicts one embodiment of an interface for configuring the parameters of a download module for an RPA application when a user selects the "Download" module 520 in the interface of FIG. 5A.

FIG. 6A depicts one embodiment of interface that may be presented by a designer interface for selection of a hook module for inclusion in an RPA application (e.g., once the user has selected a "Hook" module in the interface of FIG.

3). As above, once a user has selected a specific module from the interface of FIG. 6A for inclusion in the RPA application being built, an associated interface for the configuration of any parameters associated with the selected module may be presented to the user by the designer interface to allow the user to configure values for those parameters for that module with respect to the RPA application being built.

Figure 6E:
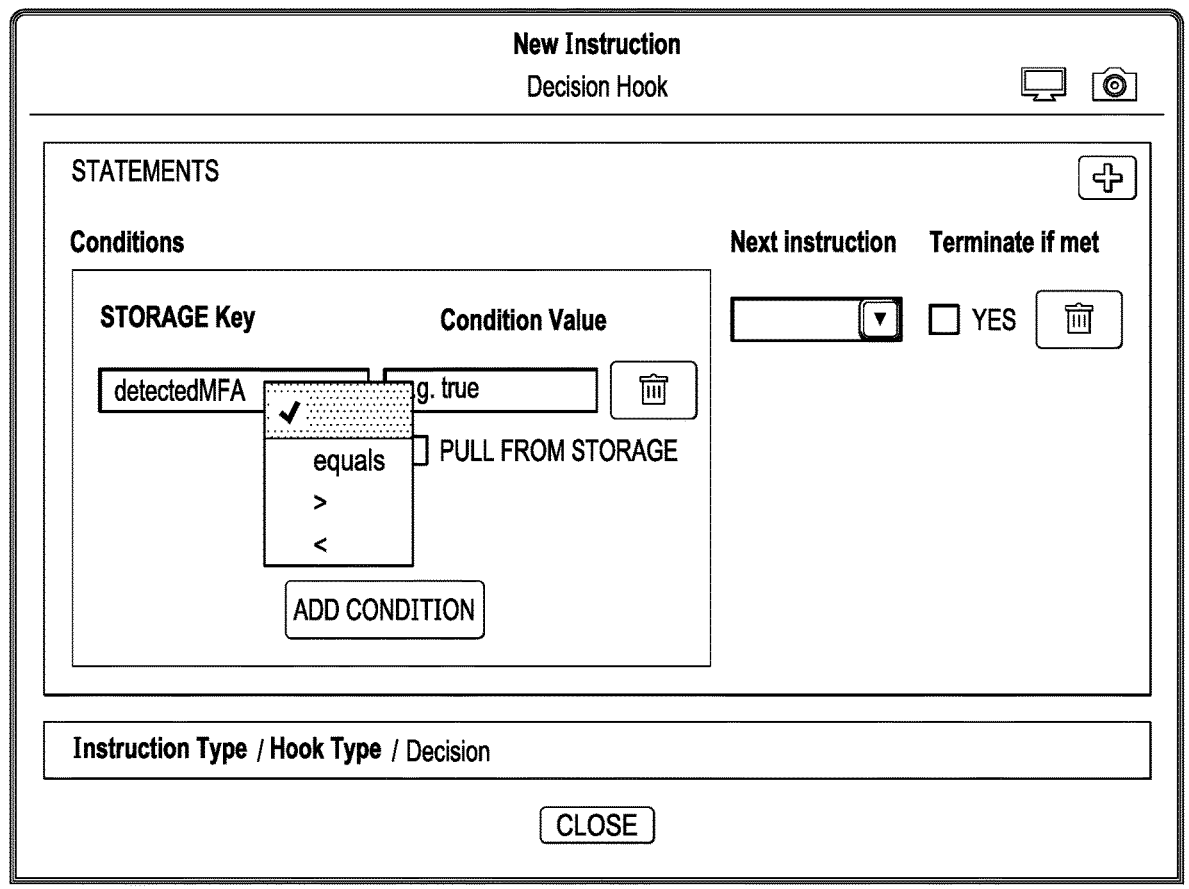

In this embodiment, FIG. 6B depicts one embodiment of an interface for configuring the parameters of a data gauntlet module for an RPA application when a user selects the "Data gauntlet" module 602 in the interface of FIG. 6A. FIG. 6C depicts one embodiment of an interface for configuring the parameters of an extract .pdf module for an RPA application when a user selects the "Extract PDF" module 604 in the interface of FIG. 6A and one embodiment of an interface for configuring the parameters of an authorization response module for an RPA application when a user selects the "Auth response" module 606 in the interface of FIG. 6A. FIG. 6D depicts one embodiment of an interface for configuring the parameters of a Bill has balance module for an RPA application when a user selects the "Bill has balance" module 608 in the interface of FIG. 6A and one embodiment of an interface presented when a user selects the "Bill response" module 610 in the interface of FIG. 6A (denoting no confirmation is needed). FIG. 6E depicts one embodiment of an interface for configuring the parameters of a decision module for an RPA application when a user selects the "Decision" module 616 in the interface of FIG. 6A.

It may now be useful to present an example of the definition of an RPA application according to embodiments along with an associated definition of the RPA application and instructions for a browser automation platform that may be produced during the execution of such an application. The example presented may be an RPA application that may automate the retrieval of the current stock price for Q2 Software, Inc. from their associated web site at www.q2ebanking.com.

Figure 7A:
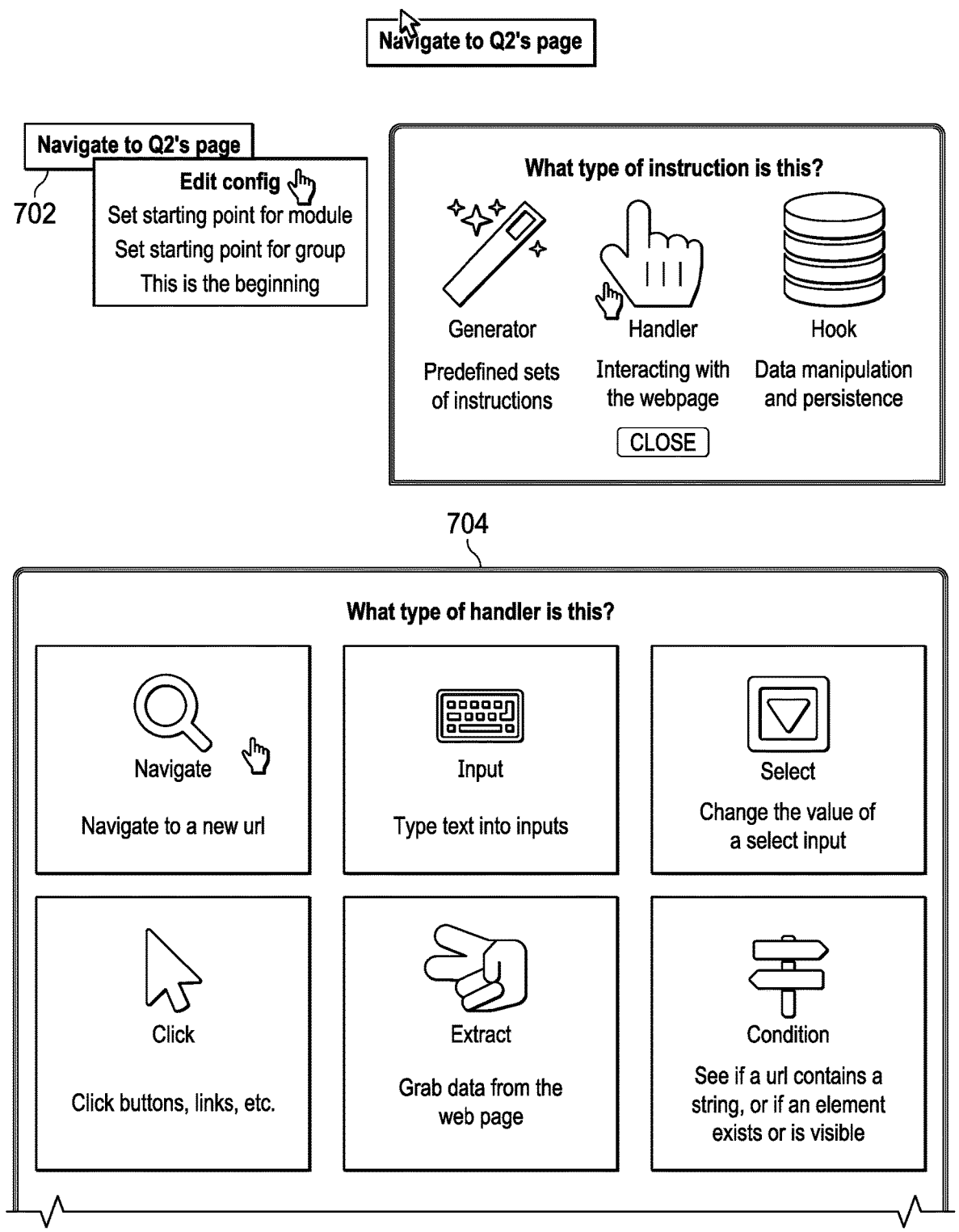

For this example, FIG. 7A depicts an embodiment of an interface for a designer interface. Here, the user has defined a module for the application using a module icon 702 giving it a title "Navigate to Q2's page". The user has then interacted with the interface to select the module being defined will be a handler module (e.g., using window 704) and specifically that the type of handler module being defined will be a "Navigate" module. The user can also interact with the interface (e.g., by clicking on the module icon 702) to configure the parameters of the interface.

Figure 7B:
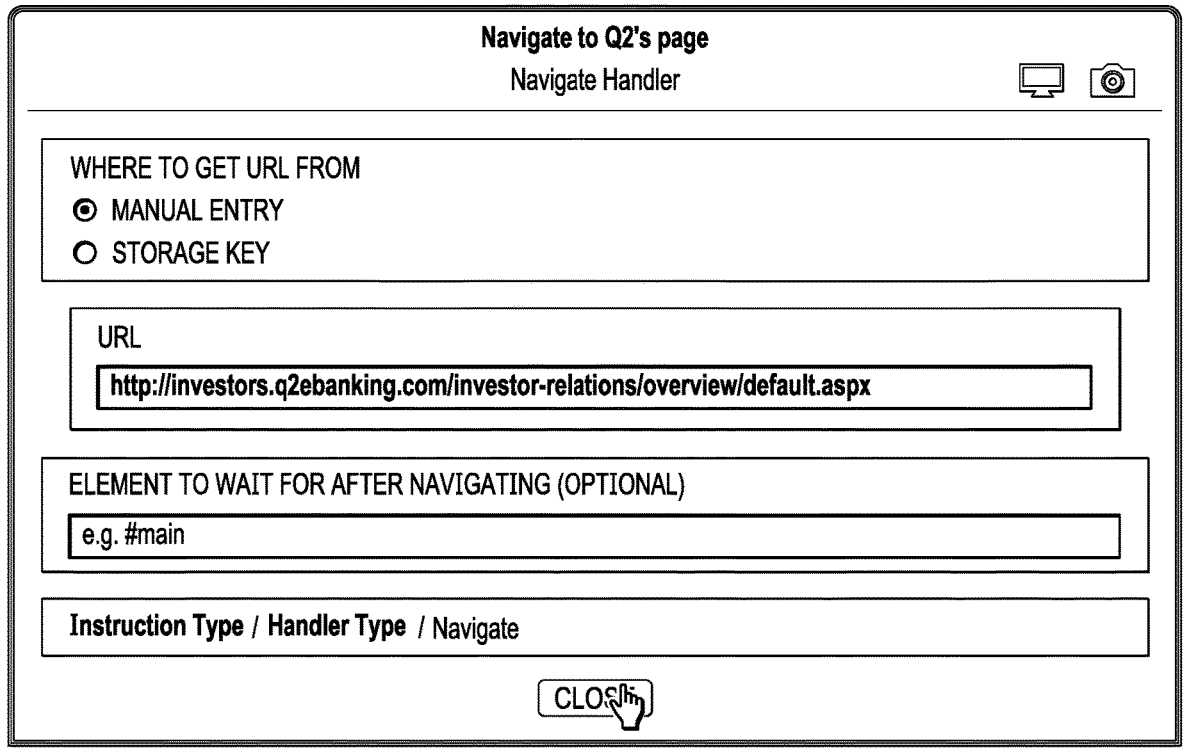

When the user interacts with the designer interface to configure the "Navigate to Q2's page module", as the module being defined is a Navigate module. The interface depicted in FIG. 7B may be displayed through the designer interface. The user may interact with this interface to designate parameters for the module being defined, here that the URL associated with the navigate module being defined will be specified by the user, and specify the URL for the navigate module being defined. In this example http://investors.q2ebanking.com/investor-relations/overview/default.aspx. The navigation handler is now configured. In this case, the user specifies the URL for navigation and, during execution, the handler module will determine when the page is fully loaded. The user can then click the "close" button at which point the interface may close the module configuration window and return to the interface depicted in FIG. 7C.

Figure 7C:
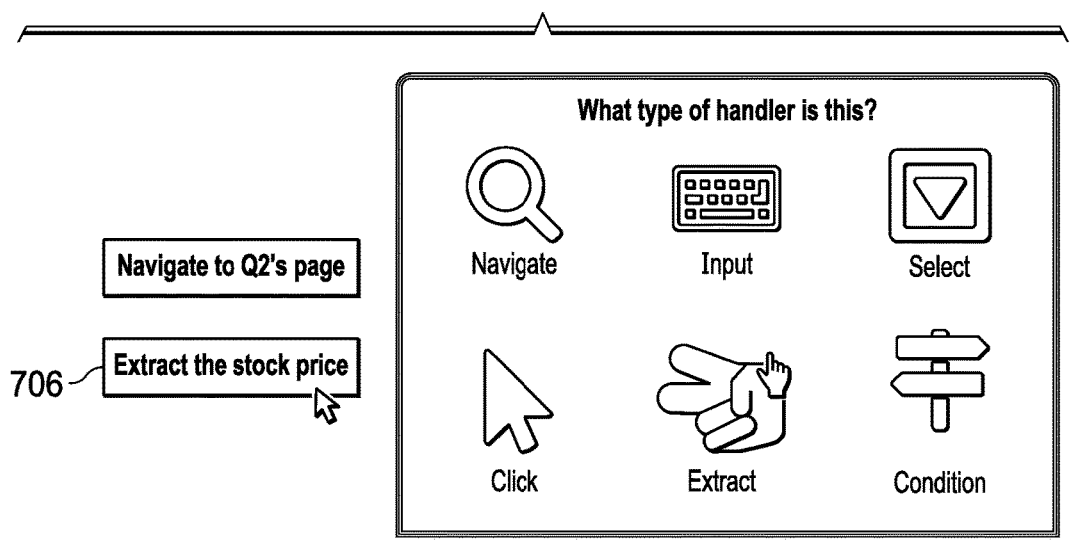

In FIG. 7C, the user has defined a module for the application using a module icon 706 giving it a title "Extract the stock price". The user then interacts with the interface to select the module being defined will be an extract module.

The user can interact with the interface presented in FIG. 7D to configure the parameters of the interface. Here, the user has assigned a storage key "Stock Price" so that the extracted data can be used later in the defined RPA application. Additionally the user configures the module to specify where the data will be found. In this case, the element containing the stock price has a ".StockPrice" class assigned to it, which the module can use to locate the desired element and store it at the RPA system in association with the storage key "Stock Price". In FIG. 7E, the user utilizes the designer interface to link the created modules via a drag-n-drop interaction to designate the order of execution of the modules for the RPA application being defined.

Figure 7F:
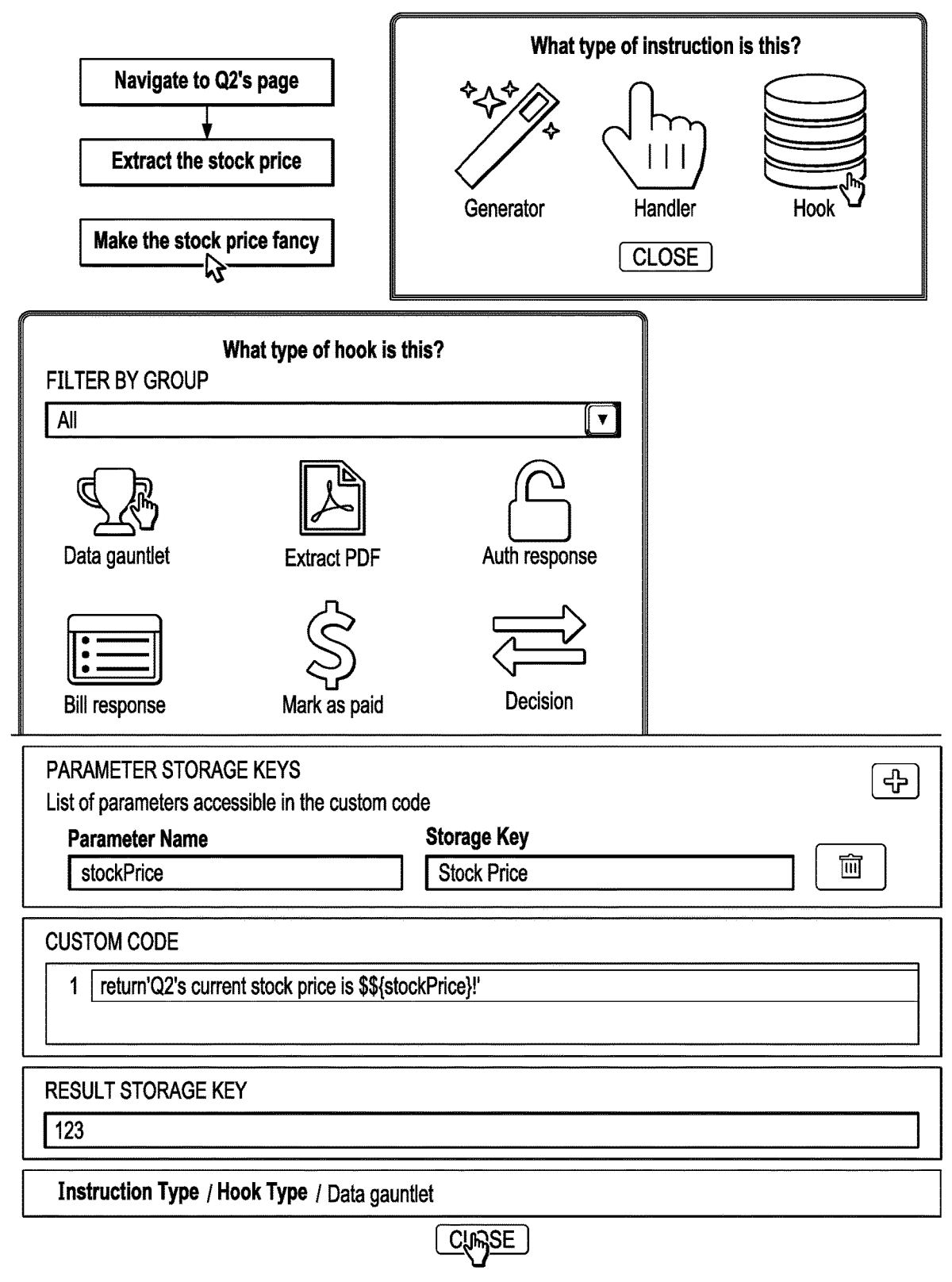

In FIG. 7F a third module is added to make a user friendly message that states the stock price. In this case, a "Hook" module will be used to take the "Stock Price" saved earlier, and map it to a variable called "stockPrice" which can be used to form a friendly message to a user. It can then be saved to another output key which has been designated as "123" in this example.

Thus, the module definition for example defined RPA application for the "Navigate to Q2's page" module may be as follows which includes the configuration settings, and what the subsequent instruction to be executed will be ('next' key specifies the identifier of the next module definition to execute for the application).

```
{
    "_id" : ObjectId("5b1fdb2ddb8dc112ebc60e8e"),
    "location" : "68 -219",
    "title" : "Navigate to Q2's page",
    "handler" : "navigate",
    "parameters" : {
        "url" : "http://investors.q2ebanking.com/investor-relations/overview/default.aspx",
        "dataSource" : "manual-entry"
    },
    "isStart" : true,
    "biller" : ObjectId("59246dd0a4f6b30c61b2622a"),
    "_v" : 0,
    "created" : ISODate("2018-06-12T14:35:11.367Z"),
    "next" : ObjectId("5b1fdb2ddb8dc112ebc60e90")
}
```

This configuration is passed into the following handler, that is adapted to conclude execution when either the page finishes loading, a specific element is found on the page indicating it's safe to continue, or a timeout occurs.

```
module.exports = async instruction => {
  const { parameters } = instruction
  LOGGER.log('NAVIGATE', JSON.stringify(parameters, null, ' '))
  await navigate(parameters)
}
const navigate = async parameters => {
  const dataSource = parameters.dataSource
  const url =
      dataSource === 'manual-entry'
      ? parameters.url
      : dataSource === 'storage' ? STORAGE[parameters.storageKey] :
parameters.url
  const waitForElement = parameters.waitForElement
  const result = await Promise.race([gotoAndWait(url, waitForElement),
timeout( )])
  if (!result) {
    throw new Error('Page failed to navigate. Timeout was fired.')
  }
}
const gotoAndWait = async (url, waitForElement) => {
  try {
    await SCRAPER.goto(url)
```

```
    await wait(waitForElement)
  } catch (err) {
    LOGGER.log('Ignored navigation error', err.message, err.stack,
    err.toString( ))
  }
  return true
}
const wait = async selector => {
  if (!selector) {
    return
  }
  await SCRAPER.waitFor(selector)
}
const timeout = ( ) => {
  return new Promise(resolve => {
    setTimeout(( ) => {
      resolve(false)
    }, 35000)
  })
}
```

The module definition for the second module ("Extract the stock price") is as follows:

```
{
    "_id" : ObjectId("5b1fdb2ddb8dc112ebc60e90"),
    "location" : "67 -160",
    "title" : "Extract the stock price",
    "handler" : "extract",
    "parameters" : {
        "selector" : ".StockPrice",
        "key" : "Stock Price"
    },
    "biller" : ObjectId("59246dd0a4f6b30c61b2622a"),
    "_v" : 0,
    "created" : ISODate("2018-06-12T14:35:11.370Z"),
    "next" : ObjectId("5b1fdb2ddb8dc112ebc60e8d")
}
```

When this module definition is evaluated by the RPA execution engine it can be passed to the associated code for the Extract module as follows:

```
// Extract Handler
const InstructionError = require('../errors').Instruction
const ExtractionFormatter = require('../../tools/extraction-formatter')
const Cheerio = require('cheerio')
const Actions = require('../../scraper/actions')
module.exports = instruction => {
  let parameters = instruction.parameters
  let { source, key, selector, code } = parameters
  LOGGER.log('EXTRACT', JSON.stringify(parameters, null, ' '))
  // If the entire source of the page should be extracted
  if (source) {
    return extractSource(key)
  } else if (selector || code) {
    // Otherwise extract the data by selector or custom code
    return extractData(instruction).then(text => processExtraction(parameters, text))
  } else {
    return Promise.reject(new InstructionError('Invalid extraction parameters.',
instruction._id))
  }
}
const extractSource = async sourceKey => {
  const maxPolls = 10
  let polls = 0
  let pageSource = undefined
  LOGGER.log('Extracting source')
  while (polls < maxPolls && !pageSource) {
    LOGGER.log('Extract source poll:', polls)
    const source = await Actions.page.getSource( )
    if (source && typeof source === 'string') {
      pageSource = source
    }
    polls++
  }
  STORAGE[sourceKey] = pageSource
  if (!pageSource) {
    throw new Error('Was not able to extract page source.')
  }
}
function extractData(instruction) {
  return new Promise((resolve, reject) => {
    let parameters = instruction.parameters
    let pollPage = undefined
    let pollInterval = parameters.poll ? Number(parameters.poll) : 50
    let waitTimeout = undefined
    let waitInterval = parameters.wait ? Number(instruction.parameters.wait) : 5000
    // Timeout for this handler, after waitInterval is up, if we haven't extracted any
data, timeout this command
    waitTimeout = setTimeout(( ) => {
      clearInterval(pollPage)
      // Set the value of this storage key to undefined so that a previous value is
overridden
```

```
        STORAGE[parameters.key] = undefined
        let error = parameters.code
        ? 'Could not extract data with custom code after ${waitInterval}ms.'
        : 'Could not locate element "${parameters.selector}" after ${waitInterval}ms.'
        // If the parameters specify to terminate if no extraction is found, then throw a
normal Error
        // Otherwise throw an InstructionError (which allows the job to keep running)
        const errorType = parameters.terminate ? Error : InstructionError
        return reject(new errorType(error, instruction._id))
      }, waitInterval)
    // Polls for data specified by the parameters every pollInterval ms
    pollPage = setInterval(( ) => {
      // Grab the source code of the page to plug into cheerio
      Actions.page
        .getSource( )
        .then(source => {
          // If no source is found try again
          if (!source) return
          // If the parameters specify a "negate" condition (which means we find
text that means the data we're looking to extract won't exist ever)
          // For example: if we're looking for the data contained in the "#last-pay-
date" selector, we could specify "No payments made recently"
          // as the "negate" condition; so that if "No payments made recently" is
matched, then we know the "#last-pay-date" selector will
          // never be found, and we can stop this command
          if (parameters.negate) {
            // If we want to match against a specified container, other than the
whole document
            if (parameters.negate.container) {
              let $ = Cheerio.load(source)
              source = $(parameters.negate.container).text( )
            }
            // Checks to see if any of the strings match text in the source
            let sourceContainsMatches =
parameters.negate.matches.some(match => {
              let compare = new RegExp(match.text, 'igm')
              return source.match(compare)
            })
            if (sourceContainsMatches) {
              LOGGER.log(
                'Extraction found negation "${JSON.stringify(parameters.negate,
null, ' ')}"'
              )
              clearInterval(pollPage)
              clearTimeout(waitTimeout)
              return resolve( )
            }
          }
          // Otherwise extract by selector or custom code
          let $ = Cheerio.load(source)
          let extraction
          // If we want to extract by selector
          if (parameters.selector) {
            extraction = $(parameters.selector).text( )
          } else if (parameters.code) {
            // If we want to extract by custom code
            extraction = eval('(function ( ) { ${parameters.code} })( )')
          }
          // If we extracted something, then stop the poll and return the extracted
data, otherwise poll again
          let valid = result =>
          typeof result === 'boolean' || typeof result === 'number' || result ? true :
false
          if (valid(extraction)) {
            clearInterval(pollPage)
            clearTimeout(waitTimeout)
            return resolve(extraction)
          }
        })
        .catch(err => {
          clearInterval(pollPage)
          clearTimeout(waitTimeout)
          return reject(err)
        })
    }, pollInterval)
  })
}
// Parse the extracted text into a more friendly format (aka no new lines or extra
padded space)
```

```
function processExtraction(parameters, extraction) {
  extraction = ExtractionFormatter.parse(extraction)
  STORAGE[parameters.key] = extraction
  LOGGER.log(`Extraction found "${extraction}"`)
  return Promise.resolve( )
}
```

The module definition for the second module ("Make the stock price fancy") is as follows:

```
"_id" : ObjectId("5b1fdb2ddb8dc112ebc60e8d"),
"location" : "53 -93",
"title" : "Make the stock price fancy",
"hook" : "data.gauntlet",
"parameters" : {
  "key" : "123",
  "parameters" : [
    {
      "key" : "Stock Price",
      "name" : "stockPrice"
    }
  ],
  "code" : "return Q2's current stock price is $${stockPrice}!'"
},
"biller" : ObjectId("59246dd0a4f6b30c61b2622a"),
"_v" : 0,
"created" : ISODate("2018-06-12T14:35:11.371Z"),
"next" : ObjectId("5b1fdb2ddb8dc112ebc60e8f")
}
```

When this module definition is evaluated by the RPA execution engine it can be passed to the associated code for the data gauntlet hook module as follows to generate the correct output:

```
return new Promise(resolve => {
  let paramNames = instruction.parameters.parameters
    .map(param => {
      return param.name
    })
    .join(',')
  let paramValues = instruction.parameters.parameters.map(
    param => STORAGE[param.key]
  )
  let code = '(function (${paramNames}) {
  ${instruction.parameters.code} })'
    let func = eval(code)
    let result = func(...paramValues)
    STORAGE[instruction.parameters.key] = result
    LOGGER.log('Gauntlet result:', result)
    return resolve( )
  })
}
```

Accordingly, upon executing of this example RPA application, logging of output is given per instruction. As presented in FIG. 8 the data was extracted, and the friendly message was generated according to the RPA application defined.

It should be noted here, that while embodiments have been explained with respect to the automation user tasks with respect to online platforms and certain tasks, embodiments as disclosed herein may be equally effectively utilized and applied to automate interactions with websites through browser automation tools and the generation of scripts or code for such automation tools almost regardless of the website tasks which it is desired to automate.

Embodiments as described herein may be more clearly understood with reference to the attached Appendices, where Appendix A illustrates one embodiment of a set of variables for a context available to an RPA application and Appendix B is an example of a defined RPA application. It will be understood that the Appendices illustrates embodiments only and that any language, code or examples given respect to those embodiments should be taken as only applicable to those embodiments and not necessarily to embodiments generally.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example, only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system for robotic process administration (RPA), the system comprising:
   a processor;
      a data store storing a set of reusable modules each module comprising computer executable code for generating browser automation instructions for performing a task at a website using a browser automation platform and a configuration parameter;
   a non-transitory computer readable medium, storing instructions for:
   a designer interface adapted to allow a user to define a first RPA application for a first website and to define a second RPA application for a second website that is different from the first website, the user defining the first RPA application by:
      selecting a module from the set of reusable modules, and configuring the selected module according to the first website for which the task is to be automated by:
defining a first value for the first website for the configuration parameter, wherein the first RPA application includes a first module definition for the selected module, the first module definition including an identifier for the selected module and the first value is defined for the configuration parameter for the selected module; and an execution engine for executing the first RPA application by:
creating a first job execution instance for the first RPA application, the first job execution instance including a first instance of a browser, a first browser automation platform, and a first state, wherein the first instance of the browser, the first browser automation platform, and the first state are specific to the first job execution instance, and
wherein, executing the first job execution instance comprises, in the first job execution instance:
accessing the first RPA application to determine the first module definition;
accessing the selected module based on the identifier for the selected module as included in the first module definition of the first RPA application to obtain the computer executable code of the selected module;
generating first browser automation instructions for the first browser automation platform by evaluating the computer executable code of the selected module against the first value for the configuration parameter of the first module definition of the first RPA application to generate the first browser automation instructions;
providing the generated first browser automation instructions to the first browser automation platform of the first job execution instance for execution against the first website in the first browser instance specific to the first job execution instance in the execution engine; and
updating the first state specific to the first job execution instance based on the execution of the first browser automation instructions against the first website in the first browser instance specific to the first job execution instance in the execution engine;
creating a second job execution instance for the first RPA application, the second job instance including a second instance of the browser, a second browser automation platform, and a second state, wherein the second instance of the browser, the second browser automation platform, and the second state are specific to the second job execution instance, and
wherein, executing the second job execution instance comprises, in the second job execution instance:
accessing the first RPA application to determine the first module definition;
accessing the selected module based on the identifier for the selected module as included in the first module definition of the first RPA application to obtain the computer executable code of the module;
generating second browser automation instructions for the second browser automation platform by evaluating the computer executable code of the selected module against the first value for the configuration parameter of the first module definition of the first RPA application to generate the second browser automation instructions; and
providing the generated second browser automation instructions to the second browser automation platform of the second job execution instance for execution against the first website in the second browser instance specific to the second job execution instance in the execution engine; and
updating the second state specific to the second job execution instance based on the execution of the second browser automation instructions against the first website in the second browser instance specific to the second job execution instance in the execution engine.

2. The system of claim 1, wherein
the designer interface is adapted to allow the user to define the second RPA application for the second website by:
selecting the module from the set of modules, and
configuring the selected module according to the second website for which the task is to be automated by:
defining a second value for the second website for the configuration parameter, wherein the second RPA application includes a second module definition for the module, the second module definition including the identifier for the selected module and the second value defined for the configuration parameter for the selected module; and
the execution engine further for executing the second RPA application by:
creating a second job execution instance for the second RPA application, the second job instance including a second instance of the browser and a second state;
accessing the second RPA application to determine the module definition;
accessing the module based on the identifier for the selected module as included in the second module definition of the second RPA application to obtain the computer executable code of the module;
generating second browser automation instructions for the browser automation platform by evaluating the computer executable code of the module against the second value for configuration parameter of the second module definition of the second RPA application to generate the second browser automation instructions, and
providing the generated second browser automation instructions to the browser automation platform for execution against the second website in the second browser instance associated with the second job instance in the execution engine.

3. The system of claim 2, wherein the first value for the configuration parameter for the first website is a variable and the execution engine is adapted to determine the first value specific to a first user based on a first context of the first job instance.

4. The system of claim 3, wherein the second value for the configuration parameter for the second website is the variable and the execution engine is adapted to determine the second value specific to a second user based on a second context of the second job instance.

5. The system of claim 1, wherein the module definition comprises a JSON object including the identifier for the module and the first value for the configuration parameter.

6. The system of claim 5, wherein the first value for the configuration parameter is associated with the document object model (DOM) of the first website.

7. The system of claim 1, wherein the set of modules includes a handler module, a generator module, and a hook module.

8. A method for robotic process administration (RPA), the method comprising:
providing a set of reusable modules, each module comprising computer executable code for generating browser automation instructions for performing a task at a website using a browser automation platform and a configuration parameter;
providing a designer interface adapted to allow a user to define a first RPA application for a first website and to define a second RPA application for a second website that is different from the first website, the user defining the first RPA application by:
selecting a module from the set of reusable modules, and
configuring the selected module according to the first website for which the task is to be automated by:
defining a first value for the first website for the configuration parameter, wherein the first RPA application includes a first module definition for the selected module, the first module definition including an identifier for the selected module and the first value is defined for the configuration parameter for the selected module; and
an execution engine for executing the first RPA application by:
creating a first job execution instance for the first RPA application, the first job execution instance including a first instance of a browser, a first browser automation platform, and a first state, wherein the first instance of the browser, the first browser automation platform, and the first state are specific to the first job execution instance, and
wherein, executing the first job execution instance comprises, in the first job execution instance:
accessing the first RPA application to determine the first module definition;
accessing the selected module based on the identifier for the selected module as included in the first module definition of the first RPA application to obtain the computer executable code of the selected module;
generating first browser automation instructions for the first browser automation platform by evaluating the computer executable code of the selected module against the first value for the configuration parameter of the first module definition of the first RPA application to generate the first browser automation instructions;
providing the generated first browser automation instructions to the first browser automation platform of the first job execution instance for execution against the first website in the first browser instance specific to the first job execution instance in the execution engine; and
updating the first state specific to the first job execution instance based on the execution of the first browser automation instructions against the first website in the first browser instance specific to the first job execution instance in the execution engine;
creating a second job execution instance for the first RPA application, the second job instance including a second instance of the browser, a second browser automation platform, and a second state, wherein the second instance of the browser, the second browser automation platform, and the second state are specific to the second job execution instance, and
wherein, executing the second job execution instance comprises, in the second job execution instance:
accessing the first RPA application to determine the first module definition;
accessing the selected module based on the identifier for the selected module as included in the first module definition of the first RPA application to obtain the computer executable code of the module;
generating second browser automation instructions for the second browser automation platform by evaluating the computer executable code of the selected module against the first value for the configuration parameter of the first module definition of the first RPA application to generate the second browser automation instructions; and
providing the generated second browser automation instructions to the second browser automation platform of the second job execution instance for execution against the first website in the second browser instance specific to the second job execution instance in the execution engine; and
updating the second state specific to the second job execution instance based on the execution of the second browser automation instructions against the first website in the second browser instance specific to the second job execution instance in the execution engine.

9. The method of claim 8, wherein
the designer interface is adapted to allow the user to define the second RPA application for the second website by:
selecting the module from the set of modules, and
configuring the selected module according to the second website for which the task is to be automated by:
defining a second value for the second website for the configuration parameter, wherein the second RPA application includes a second module definition for the module, the second module definition including the identifier for the selected module and the second value defined for the configuration parameter for the selected module; and
the second RPA application is executed by:
creating a second job execution instance for the second RPA application, the second job instance including a second instance of the browser and a second state;
accessing the second RPA application to determine the module definition;
accessing the module based on the identifier for the selected module as included in the second module definition of the second RPA application to obtain the computer executable code of the module;
generating second browser automation instructions for the browser automation platform by evaluating the computer executable code of the module against the second value for configuration parameter of the second module definition of the second RPA application to generate the second browser automation instructions, and
providing the generated second browser automation instructions to the browser automation platform for execution against the second website in the second browser instance associated with the second job instance in the execution engine.

10. The method of claim 9, wherein the first value for the configuration parameter for the first website is a variable and the execution engine is adapted to determine the first value specific to a first user based on a first context of the first job instance.

11. The method of claim 10, wherein the second value for the configuration parameter for the second website is the variable and the execution is engine is adapted to determine the second value specific to a second user based on a second context of the second job instance.

12. The method of claim 8, wherein the module definition comprises a JSON object including the identifier for the module and the first value for the configuration parameter.

13. The method of claim 12, wherein the first value for the configuration parameter is associated with the document object model (DOM) of the first website.

14. The method of claim 8, wherein the set of modules includes a handler module, a generator module, and a hook module.

15. A non-transitory computer readable medium storing instructions for:
  providing a set of reusable modules, each module comprising computer executable code for generating browser automation instructions for performing a task at a website using a browser automation platform and a configuration parameter;
  providing a designer interface adapted to allow a user to define a first RPA application for a first website and to define a second RPA application for a second website that is different from the first website, the user defining the first RPA application by:
    selecting a module from the set of reusable modules, and
    configuring the selected module according to the first website for which the task is to be automated by:
      defining a first value for the first website for the configuration parameter, wherein the first RPA application includes a first module definition for the selected module, the first module definition including an identifier for the selected module and the first value is defined for the configuration parameter for the selected module; and
    an execution engine for executing the first RPA application by:
      creating a first job execution instance for the first RPA application, the first job execution instance including a first instance of a browser, a first browser automation platform, and a first state, wherein the first instance of the browser, the first browser automation platform, and the first state are specific to the first job execution instance, and
    wherein, executing the first job execution instance comprises, in the first job execution instance:
      accessing the first RPA application to determine the first module definition;
      accessing the selected module based on the identifier for the selected module as included in the first module definition of the first RPA application to obtain the computer executable code of the selected module;
      generating first browser automation instructions for the first browser automation platform by evaluating the computer executable code of the selected module against the first value for the configuration parameter of the first module definition of the first RPA application to generate the first browser automation instructions;
      providing the generated first browser automation instructions to the first browser automation platform of the first job execution instance for execution against the first website in the first browser instance specific to the first job execution instance in the execution engine; and
      updating the first state specific to the first job execution instance based on the execution of the first browser automation instructions against the first website in the first browser instance specific to the first job execution instance in the execution engine;
    creating a second job execution instance for the first RPA application, the second job instance including a second instance of the browser, a second browser automation platform, and a second state, wherein the second instance of the browser, the second browser automation platform, and the second state are specific to the second job execution instance, and
    wherein, executing the second job execution instance comprises, in the second job execution instance:
      accessing the first RPA application to determine the first module definition;
      accessing the selected module based on the identifier for the selected module as included in the first module definition of the first RPA application to obtain the computer executable code of the module;
      generating second browser automation instructions for the second browser automation platform by evaluating the computer executable code of the selected module against the first value for the configuration parameter of the first module definition of the first RPA application to generate the second browser automation instructions; and
      providing the generated second browser automation instructions to the second browser automation platform of the second job execution instance for execution against the first website in the second browser instance specific to the second job execution instance in the execution engine; and
      updating the second state specific to the second job execution instance based on the execution of the second browser automation instructions against the first website in the second browser instance specific to the second job execution instance in the execution engine.

16. The non-transitory computer readable medium of claim 15, wherein
  the designer interface is adapted to allow the user to define the second RPA application for the second website by:
    selecting the module from the set of modules, and
    configuring the selected module according to the second website for which the task is to be automated by:
      defining a second value for the second website for the configuration parameter, wherein the second RPA application includes a second module definition for the module, the second module definition including an identifier for the selected module and the second value defined for the configuration parameter for the selected module; and
  the second RPA application is executed by:
    creating a second job execution instance for the second RPA application, the second job instance including a second instance of the browser and a second state;
    accessing the second RPA application to determine the module definition;
    accessing the module based on the identifier for the selected module as included in the second module definition of the second RPA application to obtain the computer executable code of the module;

generating second browser automation instructions for the browser automation platform by evaluating the computer executable code of the module against the second value for configuration parameter of the second module definition of the second RPA application to generate the second browser automation instructions, and providing the generated second browser automation instructions to the browser automation platform for execution against the second website in the second browser instance associated with the second job instance in the execution engine.

17. The non-transitory computer readable medium of claim 16, wherein the first value for the configuration parameter for the first website is a variable and the execution engine is adapted to determine the first value specific to a first user based on a first context of the first job instance.

18. The non-transitory computer readable medium claim 17, wherein the second value for the configuration parameter for the second website is the variable and the execution is engine is adapted to determine the second value specific to a second user based on a second context of the second job instance.

19. The non-transitory computer readable medium of claim 15, wherein the module definition comprises a JSON object including the identifier for the module and the first value for the configuration parameter.

20. The non-transitory computer readable medium of claim 19, wherein the first value for the configuration parameter is associated with the document object model (DOM) of the first website.

21. The non-transitory computer readable medium of claim 15, wherein the set of modules includes a handler module, a generator module, and a hook module.

\* \* \* \* \*